US008719288B2

(12) United States Patent
Bronstein et al.

(10) Patent No.: US 8,719,288 B2
(45) Date of Patent: May 6, 2014

(54) UNIVERSAL LOOKUP OF VIDEO-RELATED DATA

(76) Inventors: Alexander Bronstein, San Jose, CA (US); Michael Bronstein, Santa Clara, CA (US); Shlomo Selim Rakib, Cupertino, CA (US)

( * ) Notice: Subject to any disclaimer, the term of this patent is extended or adjusted under 35 U.S.C. 154(b) by 1100 days.

(21) Appl. No.: 12/349,473

(22) Filed: Jan. 6, 2009

(65) Prior Publication Data

US 2009/0259633 A1    Oct. 15, 2009

Related U.S. Application Data

(63) Continuation-in-part of application No. 12/349,469, filed on Jan. 6, 2009, now Pat. No. 8,358,840.

(60) Provisional application No. 61/045,278, filed on Apr. 15, 2008.

(51) Int. Cl.
G06F 7/00 (2006.01)
G06F 17/30 (2006.01)

(52) U.S. Cl.
USPC .......................................... 707/758; 707/914

(58) Field of Classification Search
USPC ........................................................ 707/758
See application file for complete search history.

(56) References Cited

U.S. PATENT DOCUMENTS

| | | | |
|---|---|---|---|
| 6,418,271 B1 * | 7/2002 | Cookson et al. ............... 386/241 |
| 2002/0154144 A1 * | 10/2002 | Lofgren et al. ............... 345/634 |
| 2004/0216169 A1 * | 10/2004 | Fujiwara ........................ 725/135 |
| 2007/0073767 A1 * | 3/2007 | Springer et al. .......... 707/103 R |
| 2009/0083304 A1 * | 3/2009 | Dornbach et al. ............ 707/102 |

* cited by examiner

*Primary Examiner* — Kimberly Wilson
(74) *Attorney, Agent, or Firm* — Stephen E. Zweig

(57) ABSTRACT

A universal video-related lookup system and method receives a request for information associated with specific video content from a requesting device. The system and method identify a first video content identifier associated with the specific video content and retrieves first metadata associated with the specific video content based on the first video content identifier. Next, the system and method translate the first video content identifier into a second video content identifier associated with the specific video content and retrieves second metadata based on the second video content identifier. The first metadata and the second metadata are then provided to the requesting device.

20 Claims, 25 Drawing Sheets

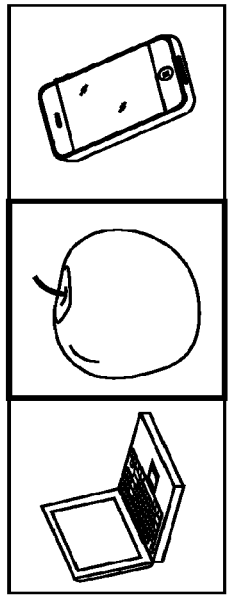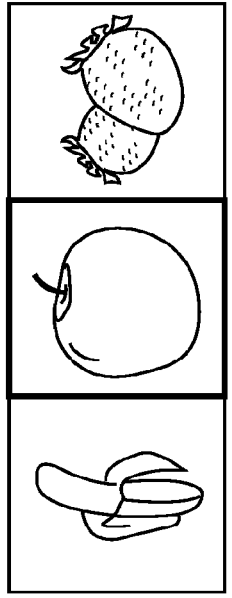
FIG. 6B

FIG. 10
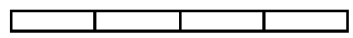
1020
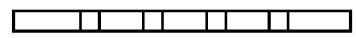
1022
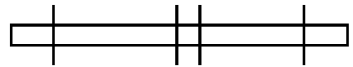
1024
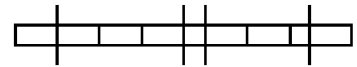
1026

UNIVERSAL LOOKUP OF VIDEO-RELATED DATA

RELATED APPLICATIONS

This application claims the priority benefit of U.S. Provisional Patent Application No. 61/045,278, "Video Genomics: a framework for representation and matching of video content", filed Apr. 15, 2008, the disclosure of which is incorporated by reference herein. This application is also a Continuation In Part of, and claims the priority benefit of, U.S. patent application Ser. No. 12/349,469, "Methods and systems for representation and matching of video content", filed Jan. 6, 2009, the disclosure of which is incorporated by reference herein. This application is also related to U.S. patent application Ser. No. 12/349,478, "Methods and systems for representation and matching of video content", filed concurrently herewith.

BACKGROUND

The invention relates generally to systems and methods for identifying and correlating multiple video content identifiers associated with specific video content. Additionally, the described systems and methods aggregate metadata associated with specific video content from one or more metadata sources.

Specific video content in a video repository may have an associated identifier that uniquely refers to this video. Such an identifier is usually referred to as a globally unique identifier (GUID). Examples of video repositories in this context include a video hosting and distribution website such as Net-Flix, YouTube, or Hulu, a collection of DVD media, a collection of media files, or a peer-to-peer network.

Typically, GUIDs are specific for each video repository. For example, videos in YouTube have an associated uniform resource locator (URL) that is unique to that online video source. Similarly, files in the BitTorrent peer-to-peer network have a hash value computed from its content and used as an identifier of the file. A DVD can be uniquely identified by a hash value produced from the media files recorded on the disc (commonly referred to as the DVDid).

In addition to repositories of video content, there exists multiple repositories of video-related information (also referred to as video-related metadata). A few examples include: Wikipedia, containing detailed descriptions of movie plots and characters; International Movie Database (IMDB), containing lists of actors performing in movies; OpenSubtitles, containing subtitles in different languages; DVDXML database containing information about DVDs, etc.

Many of these metadata repositories are available and indexed using different types of identifiers. For example, DVD-related information (e.g., cover art, list of chapters, title, etc.) can be retrieved using a DVDid. Subtitles in Open-Subtitles database are indexed by moviehash, an identifier used in the BitTorrent network. Other information sources also use a hash value associated with a movie or other video program as an index to video-related information. For certain online information services, a URL is used as an index for video-related information.

Although there are multiple ways to identify different types of video content, these identifiers are not interchangeable. Metadata repositories use some types of identifiers to access the data specific for the typical content source (e.g., subtitles are associated with moviehash, DVD information with DVDid, etc.). However, identifier for one information source will not typically work to identify video content available from another information source.

BRIEF DESCRIPTION OF THE DRAWINGS

FIG. 6B shows an example context representation using video genomics.

FIG. 10 shows an example of dividing a video sequence into temporal intervals.

Throughout the description, similar reference numbers may be used to identify similar elements.

DETAILED DESCRIPTION

The systems and methods described herein identify and correlate multiple video content identifiers associated with specific video content. Additionally, the described systems and methods aggregate metadata associated with specific video content from one or more metadata sources. For example, these systems and methods identify multiple versions of a particular video program, regardless of transcoding format, aspect ratio, commercial advertisements, altered program length, and so forth. The correlation of video content is performed in spatial and/or temporal coordinates.

Figure 1:
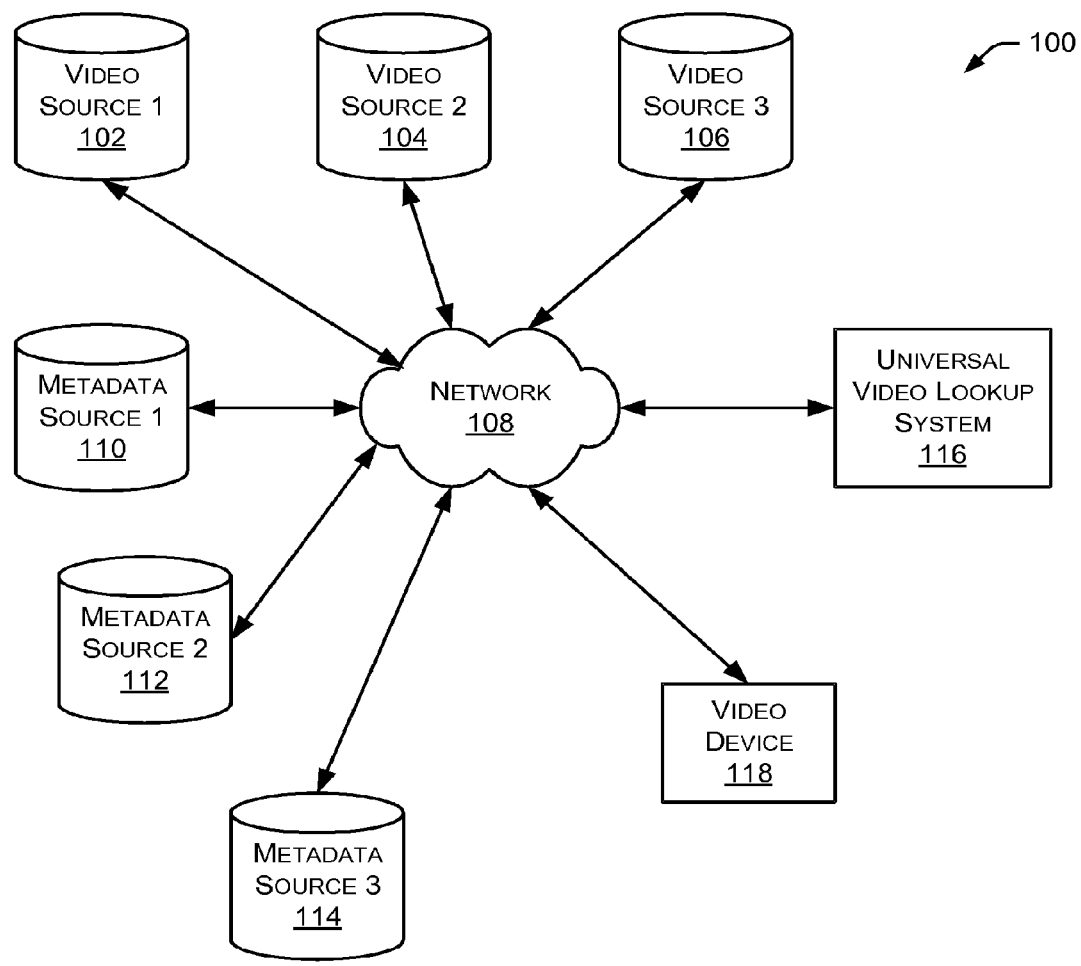
FIG. 1 shows an example environment in which the systems and methods discussed herein can be applied.

FIG. 1 shows an example environment 100 in which the systems and methods discussed herein can be applied. Environment 100 includes multiple video sources 102, 104 and 106 coupled to a network 108. Video sources 102, 104 and 106 can be any type of video storage repository, peer-to-peer network, computer system, or other system capable of storing, retrieving, streaming, or otherwise providing video content. Example video sources include a repository of movies available for downloading or streaming, a peer-to-peer network that supports the exchange of video content, a personal computer system that contains video content, a DVD player, a Blu-ray Disc™ player, a digital video recorder, a game console, YouTube, NetFlix, BitTorrent, and the like. Example video content includes movies, television programs, home videos, computer-generated videos and portions of full-length movies or television programs.

Network 108 is a data communication network implemented using any communication protocol and any type of communication medium. In one embodiment, network 108 is the Internet. In other embodiments, network 108 is a combination of two or more networks coupled to one another. Network 108 may be accessed via a wired or wireless communication link.

Environment 100 also includes multiple metadata sources 110, 112 and 114 coupled to network 108. Metadata sources 110, 112 and 114 can be any type of metadata storage repository, computer system, or other system capable of storing, retrieving, or otherwise providing metadata related to video content. The video-related metadata includes information such as cover art for a DVD, subtitle information, video content title, actors in a video program, a narrative summary of the video content, an author/producer of the video content, viewer comments associated with video content, and the like. Example metadata sources include web-based services such as the dvdxml.com database, opensubtitles.org database, the International Movie Database (IMDB), YouTube user comments, and the like. The dvdxml.com database contains information about DVD versions of movies, such as title and key actors. The opensubtitles.org database contains subtitle files in a variety of different languages for various movies.

Additionally, environment 100 includes a universal video lookup system 116 and a video device 118, both of which are coupled to network 108. As described herein, universal video lookup system 116 identifies and correlates multiple video content identifiers associated with specific video content. Additionally, universal video lookup system 116 aggregates metadata associated with specific video content from one or more metadata sources 110, 112 and 114. Additional details regarding universal video lookup system 116 components and operation are provided herein. Video device 118 is capable of receiving and processing video content, for example, to display on one or more display devices (not shown). Specific examples of video device 118 include a computer, set top box, satellite receiver, DVD player, Blu-ray Disc™ player, digital video recorder, game console and the like.

Although FIG. 1 shows three video sources 102, 104 and 106, and three metadata sources 110, 112 and 114, a particular environment 100 may include any number of video sources and any number of metadata sources. Additionally, a particular environment 100 may include any number of video devices 118, universal video lookup systems 116, and other devices or systems (not shown) coupled to one another through network 108.

Although the various components and systems shown in FIG. 1 are coupled to network 108, one or more components or systems can be coupled to universal video lookup system 116 via another network, communication link, and the like.

Figure 2:
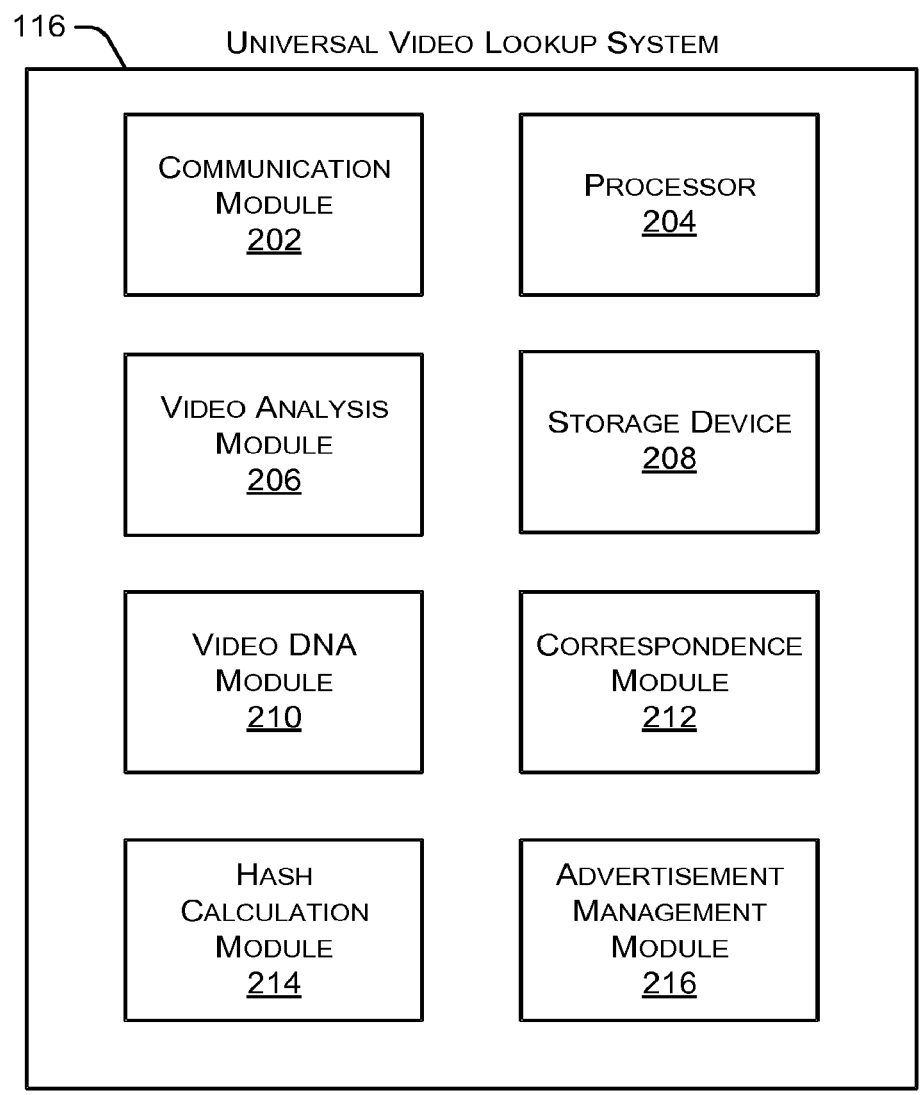
FIG. 2 shows an example universal video lookup system capable of implementing the procedures discussed herein.

FIG. 2 shows an example of universal video lookup system 116 that is capable of implementing the procedures discussed herein. Universal video lookup system 116 includes a communication module 202, a processor 204, a video analysis module 206 and a storage device 208. Communication module 202 communicates data and other information between universal video lookup system 116 and other devices, such as video sources, metadata sources, video devices, and so forth. Processor 204 performs various operations necessary during the operation of universal video lookup system 116. For example, processor 204 is capable of performing several methods and procedures discussed herein to process video content identifiers and metadata associated with the video content. Video analysis module 206 performs various video processing and video analysis operations as discussed herein. For example, video analysis module 206 is capable of identifying content contained within the video data being displayed. Storage device 208 stores data and other information used during the operation of universal video lookup system 116. Storage device 208 may include one or more volatile and/or non-volatile memories. In a particular embodiment, storage device 208 includes a hard disk drive combined with volatile and non-volatile memory devices.

Universal video lookup system 116 also includes a video DNA module 210, a correspondence module 212, a hash calculation module 214, and an advertisement management module 216. Video DNA module 210 identifies objects within video content to find correspondence between different video sequences. Correspondence module 212 analyzes multiple video sequences to find spatial and/or temporal correspondence between two or more of the video sequences. Hash calculation module 214 calculates a hash function associated with video content or a segment of the video content. A hash function is an algorithm that converts a large amount of data (such as a media file) into a smaller "hash value". Hash values are often used as an index to a table or other collection of data. Advertisement management module 216 performs various advertisement-related functions, as discussed herein. For example, advertisement management module 216 is capable of selecting among multiple advertisements for insertion into video content based on various factors.

Although not shown in FIG. 2, the components of universal video lookup system 116 communicate with one other via one or more communication links, such as buses, within the universal video lookup system 116. In particular embodiments, various modules shown in FIG. 2 (such as video analysis module 206, video DNA module 210, correspondence module 212, hash calculation module 214 and advertisement management module 216) represent computer-readable instructions that are executed, for example, by processor 204.

Figure 3:
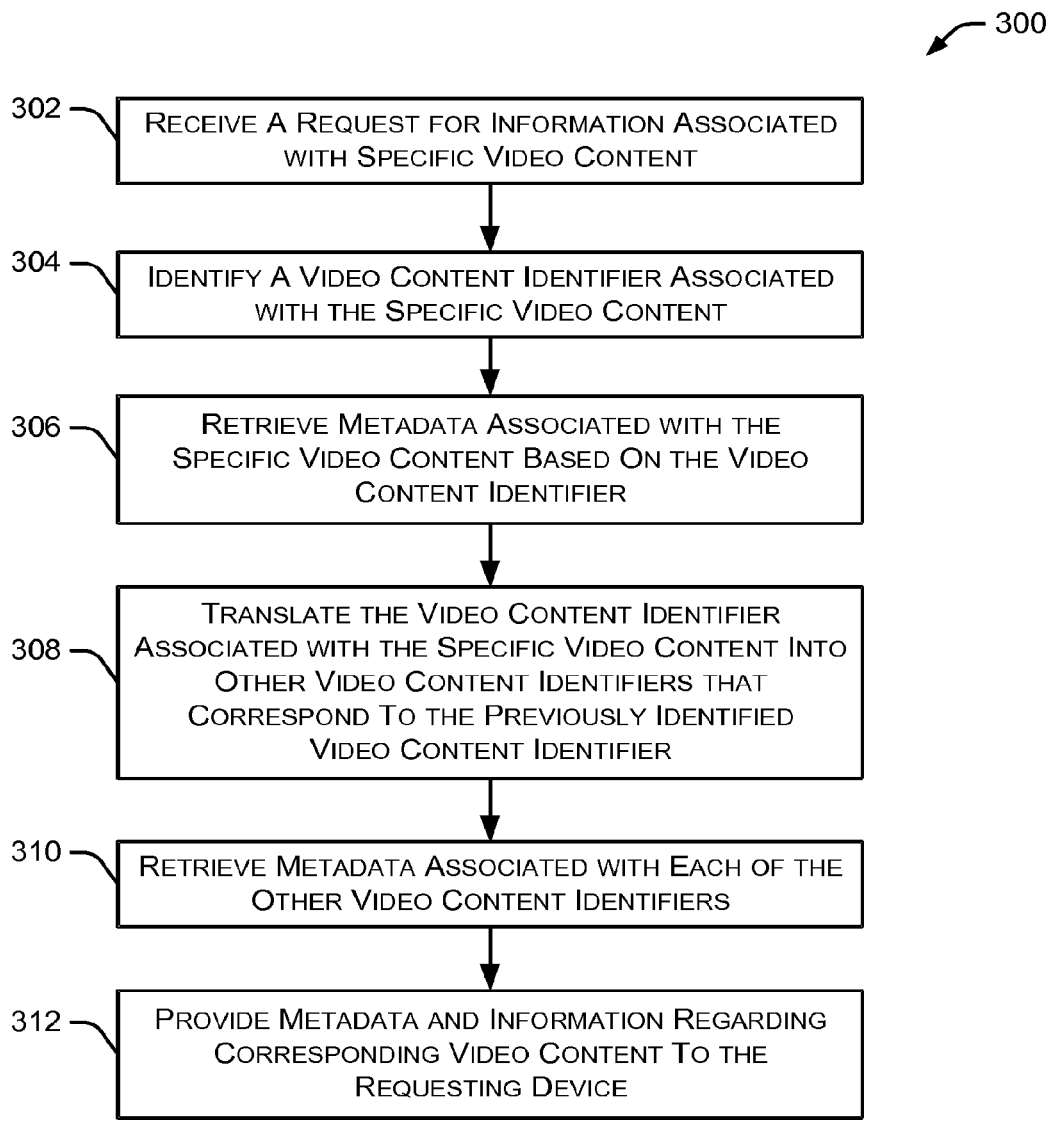
FIG. 3 is a flow diagram showing an embodiment of a procedure for retrieving video content identifiers and metadata associated with specific video content.

FIG. 3 is a flow diagram showing an embodiment of a procedure 300 for retrieving video content identifiers and metadata associated with specific video content. Initially, procedure 300 receives a request for information associated with specific video content (block 302). This request is received, for example, from video device 118 shown in FIG. 1. The requested information may include metadata associated with the video content or other versions of the video content. Procedure 300 continues by identifying a video content identifier associated with the specific video content (block 304). The request may include a video content identifier associated with the video content, a link to the video content, or a portion of the video content itself. If the request does not include a video content identifier, the procedure identifies an associated video content identifier based on the specific video content, as discussed below.

Procedure 300 continues by retrieving metadata associated with the specific video content based on the video content identifier (block 306). The retrieved metadata can be associated with the entire video content, associated with a specific time interval in the video content, or associated with a spatio-temporal object in the video content. This metadata can be retrieved from any number of metadata sources. For example, one metadata source provides subtitle information, another metadata source includes actor information, and a third metadata source includes reviews and user ratings of the associated video content. The procedure then translates the video content identifier associated with the specific video content into other video content identifiers that correspond to the previously identified video content identifier (block 308). The translation of the video content identifier into corresponding video content identifiers may have been previously performed and stored in a database, table, or other data structure for future retrieval. Various procedures can be utilized to translate the video content identifier into corresponding video content identifiers, as discussed herein. For example, the video content identifier can be translated into another video content identifier associated with the entire video content. Alternatively, the video content identifier can be translated into a second video content identifier that refers to a specific time interval within the video content. In another implementation, the video content identifier is translated into a second video content identifier that refers to a spatio-temporal object in the video content. An example table that stores pre-computed video content identifiers has a first column of video identifiers and a second column that contains video content identifiers associated with video content similar to (or identical to) video content associated with the video identifiers in the first column of the table.

The procedure continues by retrieving metadata associated with each of the other video content identifiers (block 310). Thus, metadata associated with various versions of the same video content is retrieved from any number of metadata sources. Finally, procedure 300 provides the metadata as well as information regarding the corresponding video content to the requesting device (block 312). This information allows the requesting device to display some or all of the metadata to a user of the requesting device. Additionally, the requesting device can display all available versions of the video content to the user, thereby allowing the user to select the desired version to display.

Figure 4:
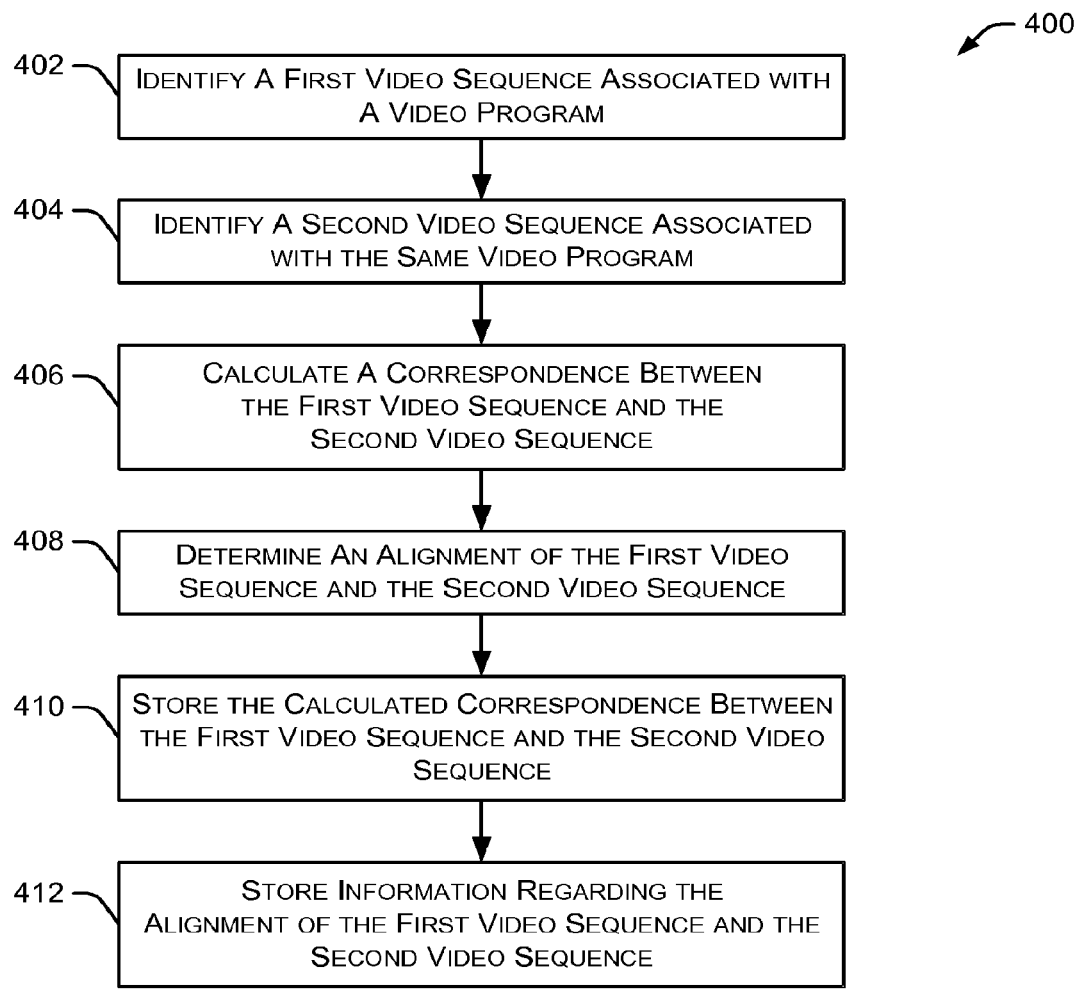
FIG. 4 is a flow diagram showing an embodiment of a procedure for determining correspondence between multiple video sequences.

FIG. 4 is a flow diagram showing an embodiment of a procedure 400 for determining correspondence between multiple video sequences associated with the same video program. The multiple video sequences are typically different versions of the same video program. The different versions may have different aspect ratios, different transcoding formats, or different broadcast versions (e.g., a full-length movie version without commercials and an edited version for television broadcast that includes commercials). Initially, procedure 400 identifies a first video sequence associated with a video program (block 402). The first video sequence may represent all or a portion of the video program. Next, the procedure identifies a second video sequence associated with the same video program (block 404). As mentioned above, the first and second video sequences are different versions of the same video program.

Procedure 400 continues by calculating a correspondence between the first video sequence and the second video sequence (block 406). This correspondence may include temporal coordinates and/or spatial coordinates. Various systems and methods are available to calculate the correspondence between the first and second video sequences. Calculating temporal correspondence between two video sequences is particularly important when the video sequences need to be synchronized in time. For example, if the subtitles contained in one video sequence are to be displayed with the video content of a second video sequence, the subtitles should be displayed at the correct time within the second video sequence. Calculating the temporal correspondence in this situation provides the appropriate synchronization.

Calculating spatial correspondence between two video sequences is particularly useful when identifying geometric information in the video sequences, such as identifying various objects in a scene. Different versions of a video program can have different resolutions, aspect ratios, and the like, such that a spatial correspondence is necessary to interchange between the two programs. For example, spatial correspondence provides for the interchange of metadata related to different types of content and different versions of the video.

The procedure of FIG. 4 continues by determining an alignment (temporally and/or spatially) of the first video sequence and the second video sequence (block 408). Alternate embodiments align the first video sequence and the second video sequence by aligning audio-based data segments.

The procedure then stores the calculated correspondence between the first video sequence and the second video sequence (block 410). The correspondence information is stored for later use in correlating the two video sequences without requiring recalculation of the correspondence. Finally, the procedure stores the information regarding the alignment of the first video sequence and the second video sequence (block 412). The alignment information is stored for future use in aligning the two video sequences without repeating the determining of the alignment of the video sequences.

The procedure of FIG. 4 determines correspondence between two particular video sequences associated with the same video program. Procedure 400 is repeated for each pair of video sequences, thereby pre-calculating the correspondence information and creating a database (or other data structure) containing the various correspondence information. The database of correspondence information is useful in accelerating operation of universal video lookup system 116 by avoiding calculation of correspondence information that is already contained in the database. This database of correspondence information may be contained within universal video lookup system 116 or accessible to the universal video lookup system (and other systems) via network 108 or other data communication link. In a particular embodiment, the pre-calculated correspondence information is offered as a data service to multiple systems and devices, such as video devices 118.

Figure 5:
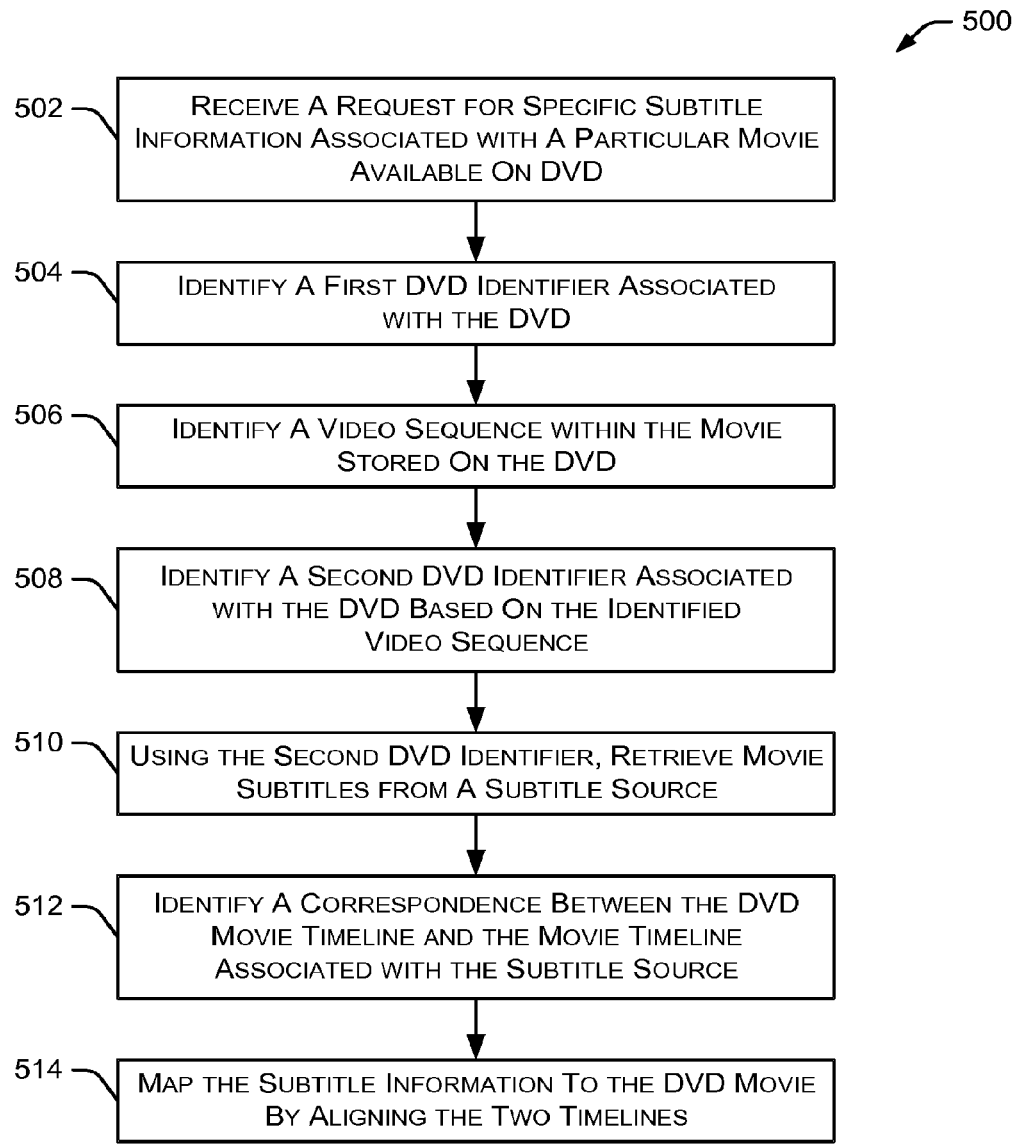
FIG. 5 is a flow diagram showing an embodiment of a procedure for identifying, retrieving, and aligning subtitle information with a movie played from a DVD.

FIG. 5 is a flow diagram showing an embodiment of a procedure 500 for identifying, retrieving, and aligning subtitle information with a movie played from a DVD. In the example of FIG. 5, a request is received for specific subtitle information associated with a particular movie available on DVD (block 502). For example, a user may want to watch a movie on DVD, but wants subtitle information in a particular language, such as the Russian language. The DVD may include subtitle information in English and Spanish, but not Russian. Using the described universal video lookup system 116 and procedure 500, the user is able to watch the desired movie on DVD with Russian subtitles.

Procedure 500 continues by identifying a first DVD identifier associated with the DVD (block 504). For example, the first DVD identifier may be a DVDid or a hash value resulting from performing a hash function on a portion of the video content on the DVD. In particular embodiments, identifiers associated with video content, such as the content stored on a DVD, can be identified based on a file name associated with the video content, a file-based hash value, or a content-based hash value. An example of a file name identifier is a URL used with fixed video repositories where the associated video content is stored permanently and not changed. A file-based hash value is useful in peer-to-peer networks to identify the same file across multiple users independently of changes to the name of the file. One example of a file-based hash value is Moviehash. A content-based hash value, such as video DNA discussed herein, analyzes the video content itself to identify the video. Thus, a content-based hash value is invariant to the file name, encoding process, processing of the video content, or editing of the video content.

After identifying the first DVD identifier, the procedure identifies a video sequence within the movie stored on the DVD (block 506). The identified video sequence may a predetermined portion of the movie, such as the first 30 seconds of the movie, or any other video sequence within the movie. Procedure 500 then identifies a second DVD identifier associated with the DVD based on the identified video sequence (block 508). The second DVD identifier is selected based on the additional information (e.g., video metadata) desired. In this example, the second DVD identifier is selected based on the type of indexing used to identify information in a source of subtitles. Thus, the second DVD identifier is used to find and retrieve Russian subtitle information in the subtitle source associated with the specific DVD selected by the user (block 510).

The procedure then identifies a correspondence between the DVD movie timeline and the movie timeline associated with the subtitle source (block 512). The subtitle information is then mapped to the DVD movie by aligning the two timelines (block 514). This correspondence and alignment is necessary to temporally synchronize the display of the subtitles with the appropriate movie content. In a particular embodiment of procedure 500, the correspondence between the DVD movie timeline and the movie timeline associated with the subtitle source is pre-computed and stored in a database or other data structure. In other embodiments, the correspondence information identified at block 512 is calculated when needed, then optionally stored for future reference.

A particular implementation of the described systems and methods includes both a metadata component and a correspondence component. The metadata component is associated with a video content identifier, such as a YouTube URL or hash function. The metadata component is also associated with a spatio-temporal coordinate, such as (x,y,t) in the video sequence corresponding to this video content identifier. In the spatio-temporal coordinate (x,y,t), x and y correspond to the two spatial dimensions and t corresponds to the time dimension. A particular metadata component is denoted m(VCI; x,y,t), where "VCI" represents the video content identifier. For different types of VCIs, the metadata may be located in different metadata sources.

In certain situations, the metadata is sequence-level data (e.g., a movie title) so the metadata component m(VCI; x,y, t)=m(VCI). In this situation, the spatial and temporal data is not relevant to the movie title.

In other situations, the metadata is interval-level data (e.g., movie subtitles) so the metadata component m(VCI; x,y,t)=m (VCI; t). In this situation, the temporal alignment of the subtitle information with the video content is important, but the spatial data is not necessary.

Finally, metadata about objects contained in the video require both spatial and temporal coordinate.

The correspondence component between two different video content identifiers is expressed as a function (x2,y2,t2)=c(VCI1,VCI2; x1,y1,t1), where (x1,y1,t1) and (x2,y2,t2) are spatio-temporal coordinates in the video sequences corresponding to VCI1 and VCI2, respectively. Correspondence can be established between video content from different sources by having VCIs of different types, (e.g., a YouTube video clip and a DVD) or between video content with VCIs of the same type, such as different editions of the same movie on DVD.

Universal video-related lookup is performed given (VCI0, x0,y0,t0) in two stages. First, the system finds VCIs that have correspondence to VCI0, denoted in this example as c(VCI0, VCI1; x0,y0,t0), c(VCI0,VCI2; x0,y0,t0) . . . c(VCI0,VCIN; x0,y0,t0). These multiple correspondences translate the coordinates (x0,y0,t0) into (x1,y1,t1), (x2,y2,t2) . . . (xN,yN,tN). Next, the system retrieves the metadata m(VCI1; x1,y1,t1), m(VCI2; x2,y2,t2) . . . m(VCIN; xN,yN,tN). For a particular metadata component, the system may retrieve the entire metadata or a portion of the metadata. For example, if the metadata contains all information regarding a movie, the system may only want to display the title and summary information for the movie, so the system only retrieves that portion of the metadata.

As discussed herein, universal video-related lookup computes the correspondence between two video sequences. In certain situations, spatio-temporal correspondence is computed. In other situations, temporal correspondence or spatial correspondence is sufficient. When spatio-temporal correspondence is necessary, an embodiment of universal video lookup system 116 first computes the temporal correspondence between the two video sequences, then computes the spatial correspondence between the same two video sequences.

Temporal correspondence between the two video sequences can be computed using various techniques. Temporal correspondence between video sequences is not necessarily a one-to-one correspondence due to insertions and/or deletions in one or both video sequences, which appear as gaps in the correspondence. A general description of temporal correspondence is written as a set of pairs (t1,t2), meaning that time t1 in the first video sequence corresponds to time t2 in the second video sequence. A dynamic programming algorithm, such as the Smith-Waterman algorithm, is used to find an optimal alignment (e.g., correspondence with one or more gaps) between two video sequences. The data used to perform the alignment can be an audio track or a video-based descriptor, such as a Video DNA descriptor discussed herein.

As discussed above, the correspondence between two video sequences can be pre-computed for a particular pair of video content identifiers. Typically, there is a "master" version of the video content, which is the most complete and authoritative version of the video content. All other versions of the same video content will be synchronized to the master version (e.g., the correspondence is computed using the master version as the reference). In a particular example, a DVD version of a movie is used as the master and all other versions (such as YouTube versions and BitTorrent versions) are aligned with the timeline of the DVD.

Various systems and methods can identify, correlate, track, match, and align video frames and video sequences. A particular embodiment for performing these types of functions is discussed below. Video data includes spatio-temporal data, containing two spatial dimensions and one temporal dimension (i.e., the two dimensional video images and the time sequence of the different video frames). We distinguish between temporal and spatial correspondence of two different video frames. Temporal correspondence is performed at the time granularity of the time between different video frames: the video sequences are regarded as one-dimensional ordered sequences of frames, and the matching produces a correspondence between the frames in the two sequences. Spatial correspondence is performed at a sub-frame granularity, finding matching between corresponding pixels or regions of pixels "things" within two frames in the sequences.

The correspondence and similarity problems are intimately related, and usually computing one problem allows one to infer that the other problem is also being computed. For example, we can define the similarity as the amount of corresponding parts of the video. Conversely, if we have a criterion of similarity between the different parts of the video sequences, we can define a correspondence that maximizes this part-wise similarity.

Here we want to distinguish between two types of similarity: semantic and visual. "Visual" similarity of two objects implies that they "look similar", i.e., their pixel representation is similar. "Semantic" similarity implies that the concepts represented by the two objects are similar. Semantic similarity defines much wider equivalence classes than visual similarity. For example, a truck and a Ferrari are visually dissimilar, but semantically similar (both represent the concept of a vehicle). As a rule, visual similarity is easier to quantify and evaluate, while semantic similarity is more subjective and problem-dependent.

There is almost always noise and distortion in video signals, caused by differing angles, lighting conditions, editing, resolution, and the like. Here an ideal similarity criterion should be invariant to these and other variations. In terms of nomenclature, if the similarity criterion deems the depictions of two objects similar no matter how they are illuminated, we say that the similarity is invariant to lighting conditions.

The described systems and methods allow for edit- and distortion-invariant matching of video sequences. More specifically, the systems and methods provide a framework for spatio-temporal matching based on visual similarity, which is invariant to temporal distortions (transformations like frame rate change), temporal edits (removal and insertion of frames), spatial distortions (pixel-wise operations) and spatial edits (removal or insertion of content into frames). On a mathematical level, the problem of spatio-temporal matching can be formulated as: given two video sequences, find a correspondence between the spatio-temporal system of coordinates (x, y, t) in the first sequence and the spatio-temporal system of coordinates (x', y', t') in the second system.

Thinking of video data as a three-dimensional array of pixels, the spatio-temporal matching problem can be considered as finding the correspondence between three-dimensional arrays. In general, this problem is so computationally complex (complexity level NP-complete), as to be impractical to compute. This is because without further simplification, the computing system will try to find matching between all the possible subsets of pixels between the first and the second sequences, which is a very large number of operations.

However, the matching problem can be greatly simplified if the problem is split into two separate processes: temporal matching and spatial matching. Here the problem of spatial matching is more complex because the video frames are two dimensional, and thus a large number of two dimensional comparisons must be made. In contrast, the one-dimensional temporal matching problem, although still complex, is enough simpler that one-dimensional (temporal) signals can be matched very efficiently using the video DNA or video genomics dynamic programming methods discussed herein.

Figure 6A:
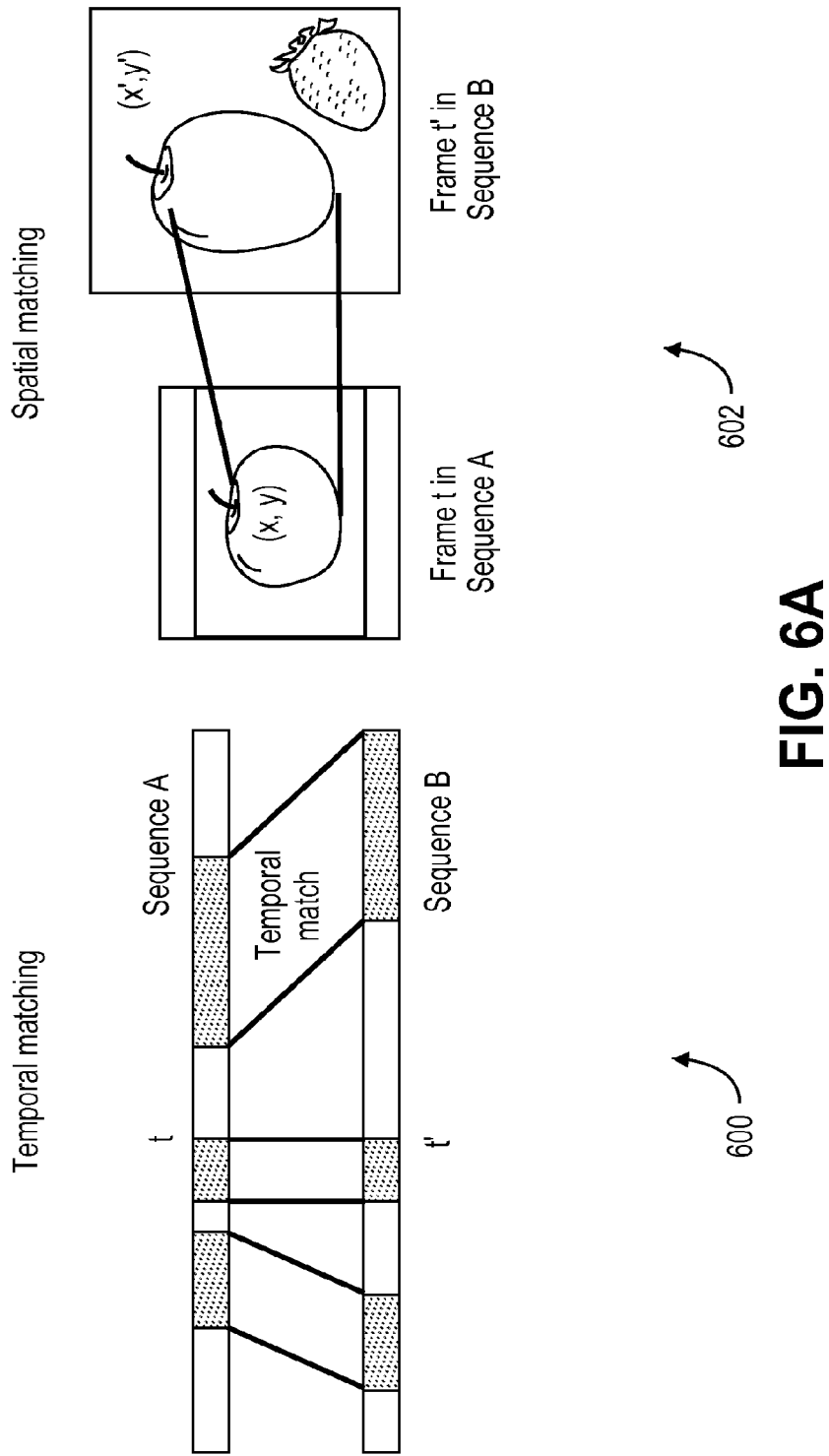
FIG. 6A shows examples of spatial alignment of video data and temporal alignment of video data.

FIG. 6A shows examples of spatial alignment of video data and temporal alignment of video data. At a first stage 600 of FIG. 6A, temporal matching is performed (this step is discussed in more detail below). Temporal matching produces the correspondence between the temporal coordinate "t" in a subset of the first video sequence and the temporal coordinate "t'" in a subset of the second video sequence. By performing temporal matching, we avoid the need to try to perform two dimensional spatial matching between all the possible subsets of pixels in the video sequences (essentially a three dimensional matching problem). Rather, the problem is reduced in size so that the spatial matching must now only be performed between the small subsets of temporally corresponding portions of the video sequences. In other words, for the spatial matching, a large 3D matching problem is turned into a much smaller 2D matching problem between relatively small sets of 2D video frames. For example, instead of trying to match the "apple" series of pixels "thing" from the entire upper video sequence into a corresponding "apple" thing in the entire lower video sequence, now just the small number of frames in "sequence A" and "sequence B" which are most relevant are examined.

Typically, one of the video sequences is a short query, and thus the size of the temporally corresponding portions of the video sequences is small, which greatly reduces the problem of spatial matching, discussed below. At a second stage 602 of FIG. 6A, spatial matching between the temporally corresponding video data is performed. Spatial matching produces the correspondence between the spatial coordinates (x, y) and (x', y') in the temporally matching portions (e.g., frames) of the first and second sequences.

In the described systems and methods, the matching can be made more robust and invariant to distortions and edits of the video content. In particular, the temporal matching can be made to be invariant to temporal edits of the video sequences. Spatial matching can be made to be invariant to spatial distortions and edits of the video sequences (for example, the different aspect ratio of the apple, different lighting, and the background of different fruits shown in FIG. 6A).

It should be understood that the methods described herein are normally carried out in a computer system containing at least one processor (often a plurality of processors will be used), and memory (often megabytes or gigabytes of memory will be used). Processors suitable for implementing the methods of the present invention will often be either general purpose processors, such as x86, MIPS, Power, ARM, or the like, or they may be dedicated image interpretation processors, such as video processors, digital signal processors, field programmable gate arrays, and the like. The methods described herein may be programmed in a high level language, such as "C", C+", java, Perl, Python, and the like, programmed in a lower level assembly language, or even embedded directly into dedicated hardware. The results of this analysis may be stored in either volatile memory, such as RAM, or in non-volatile memory such as flash memory, hard drives, CD, DVD, Blue-ray disks, and the like.

Visual information (video images) can be represented by means of a small number of "points of interest", also called "features". Typically, features are points that are easily detectable in the image in a way that is invariant to various image modifications. A "feature" in an image includes both the coordinates of the "point of interest" as well as a "descriptor" which typically describes the local image content or environment around the "point of interest". Features are often chosen for their ability to persist even if an image is rotated, presented with altered resolution, presented with different lighting, etc.

A feature is often described as a vector of information associated with a spatio-temporal subset of the video. For example, a feature can be the 3D direction of a spatio-temporal edge, local direction of the motion field, color distribution, etc. Typically, local features provide a description of the object, and global features provide the context. For example, an "apple" object in a computer advertisement and an "apple" object in an image of various fruits may have the same local features describing the object, but the global context will be different.

For example, local features may include:
Harris corner detector and its variants, as described in C. Harris and M. Stephens, "A combined corner and edge detector", Proceedings of the 4th Alvey Vision Conference, 1988;
Scale invariant feature transform (SIFT), described in D. G. Lowe, "Distinctive image features from scale-invariant keypoints," International Journal of Computer Vision, 2004;
Motion vectors obtained by decoding the video stream;
Direction of spatio-temporal edges;
Distribution of color;
Description of texture;
Coefficients of decomposition of the pixels in some known dictionary, e.g., of wavelets, curvelets, etc.
Specific objects known a priori.

Extending this idea to video data, we can abstract a video sequence into a three-dimensional structure of features (two spatial dimensions formed by the various 2D images, and one time dimension formed by the various video frames). This 3D structure can be used as the basic building blocks of a representation of the video sequence.

As previously discussed, it can be extremely useful to think about video analysis problems in biological terms, and draw insight and inspiration from bioinformatics. Here, for example, it is useful to think of the features as "atoms", the feature abstraction of the various video frames in a video as a "nucleotide", and the video itself as being like an ordered sequence of nucleotides, such as a large DNA or RNA molecule.

The spatial and the temporal dimensions in the video sequence have different interpretations. Temporal dimension can be though of as ordering of the video data—we can say that one feature comes before another. If we divide the video sequence into temporal intervals, we can consider it as an ordered sequence of "video elements", each of which contains a collection of features. As previously discussed, here we consider the video data to be an ordered sequence of smaller nucleotides, and we consider a video signal to be also composed of a string of "nucleotide-like" video subunits, called video DNA.

Drawing upon inspiration from DNA sequence analysis, the systems and methods can represent a video both as three-, two- and one-dimensional signals. Considering the entire set of feature points, we have a thee-dimensional (spatio-temporal) structure. Considering the sequence of temporal intervals, we obtain a one-dimensional representation. Considering one frame in the sequence, we obtain a two-dimensional representation. The same representation is used to carry out the temporal and spatial matching stages. An example two-stage matching approach follows.

At the first stage, a temporal representation of the video sequences is created. Each video sequence is divided into temporal intervals. Here a temporal interval is usually not just a single video frame, but rather is often a series of at least several video frames (e.g., 3 to 30 frames) spanning a fraction of a second. Temporal intervals are discussed in greater detail herein.

For each time interval, the actual video image is abstracted into a representation (also referred to herein as a visual nucleotide) containing just the key features in this interval. This series of features is then further abstracted and compressed by discarding the spatio-temporal coordinates of the various features. For example, we just start counting different types of features. In other words, we only keep track of the feature descriptors, and how many different types of feature descriptors there are.

Each time division of the video signal (which we will call a "nucleotide" in analogy to a biological nucleotide) is represented as an unordered collection or "bag" of features (or a bag of feature descriptors). Thus, if each feature is considered to be a "visual atom", the "bag of features" that represents a particular video time interval can be called a "nucleotide". The representations of the various video time intervals (visual nucleotides) are then arranged into an ordered "sequence" or map (video DNA). In this discussion, we will generally use the term "nucleotide" rather than "bag of features" because it helps guide thinking towards a useful bioinformatic approach to video analysis procedures.

The video map/video DNAs corresponding to two video sequences can be aligned in much the same way that DNA sequences can be compared and aligned. In DNA sequence analysis, one of the central problems is trying to find alignment which gives the best correspondence between subsets of the two DNA sequences by maximizing the similarity between the corresponding nucleotides and minimizing the gaps. In the systems and methods described herein, algorithms similar to those used in bioinformatics for DNA sequence alignment can be used for aligning two different video signals.

After two portions of video media are matched by the first stage, additional image analysis can be done. For example, at the second stage, the spatial correspondence between temporally corresponding subsets of the video sequences can be found. That is, "things" (pixel groups) shown in a first video can be matched with "things" shown in a second video. More specifically, we can now look for spatial correspondence between the contents of two temporally-corresponding video image frames.

In this later second stage, we do not discard the spatio-temporal coordinates of the features. Rather, in this second stage each frame is represented as a two-dimensional structure of features, and we retain the feature coordinates. For this second stage purpose of spatial matching of frames and comparing the contents of the video frames, more standard feature-based algorithms, previously used in computer vision literature can now be used.

For object recognition, and other applications where object-based analysis is required, the "video genomics" approach offers significant advantages over prior art methods, including the following. First, the systems and methods described herein offer a higher discriminative power than standalone object descriptors. This discriminative power is due to the discriminative power of the object descriptors themselves as well as the temporal support, i.e., the time sequence of these descriptors. Although some existing methods teach that the best discrimination is obtained when a large number of precisely optimized features are used, we have found that this is not the case. Surprisingly, we have found that when the systems and methods described herein are compared on a head-to head basis with prior art techniques, it turns out that the temporal support (i.e., the time order in which various feature groups appear) is more important for discriminative power than is a very large number of different descriptors. For example, increases in accuracy in object description are usually desirable. The prior art "brute force" way to increase accuracy would be to simply use more and more features and feature descriptors, but since each feature and feature descriptor is computationally intensive to produce, this prior art "brute force" approach rapidly reaches a point of diminishing returns due to high computational overhead.

However, we have found that an increase of accuracy of object description that would otherwise require a prior art increase of the visual vocabulary size by two orders of magnitude (increasing computational overhead by nearly two orders of magnitude as well) can be easily matched by the described systems and methods using a computationally less intense process. Using the systems and methods described herein, to improve accuracy, we avoid increasing the number of feature descriptors, and instead improve accuracy by an increase in the time resolution of the analysis. This is done by simply adding two more "nucleotides" (i.e., using slightly smaller time divisions in the video analysis) to the "video DNA" sequences being compared. By avoiding a drastic increase in the number of features, the systems and methods can achieve high accuracy, yet can be much more efficient from a computational overhead standpoint.

Prior art approaches, such as J. Sivic and A. Zisserman, "Video Google: a text retrieval approach to object matching in video" approached video as a collection of images and thus had to use feature "vocabularies" of very large size (up to millions of elements) in order to obtain high descriptive power. By contrast, the described use of temporal support gives equal or better results using much smaller feature vocabularies (hundreds or thousands of elements), with a corresponding large increase in computational efficiency.

A second advantage is that for content-based retrieval applications, the described systems and methods allow retrieval of both an object of interest, and the context in which the object appears. The temporal sequence can be considered as additional information describing the object, in addition to the description of the object itself.

FIG. 6B shows an example of the same object (an apple 610) appearing in two different contexts: Fruits 612 and Computers 614. In the first case, the "Apple" object appears in a sequence with a Banana and a Strawberry, which places the object in the context of Fruits. In the second case, the Apple object appears in sequence with a Laptop and an iPhone, which places the object in the context of Computers. Here, the systems and methods are sophisticated enough to recognize these context differences. As a result, the Video map/Video DNA representation in these two cases will be different, despite the fact that the object itself is the same.

By contrast, prior art approaches, such as Sivic and Zisserman, do not take into consideration the context of the video content, and thus are unable to distinguish between the two different instances of the apple object in the above example.

A third advantage is that the described "Video genomics" approach allows for performing partial comparison and matching of video sequences in many different ways. Just as methods from bioinformatics allow different DNA sequences to be compared, two different video DNA sequences can be matched despite having some dissimilar video frames (nucleotides), insertions or gaps. This is especially important when invariance to video alterations such as temporal editing is required—for example, when the video DNAs of a movie and its version with inserted advertisements need to be matched correctly.

Figure 7:
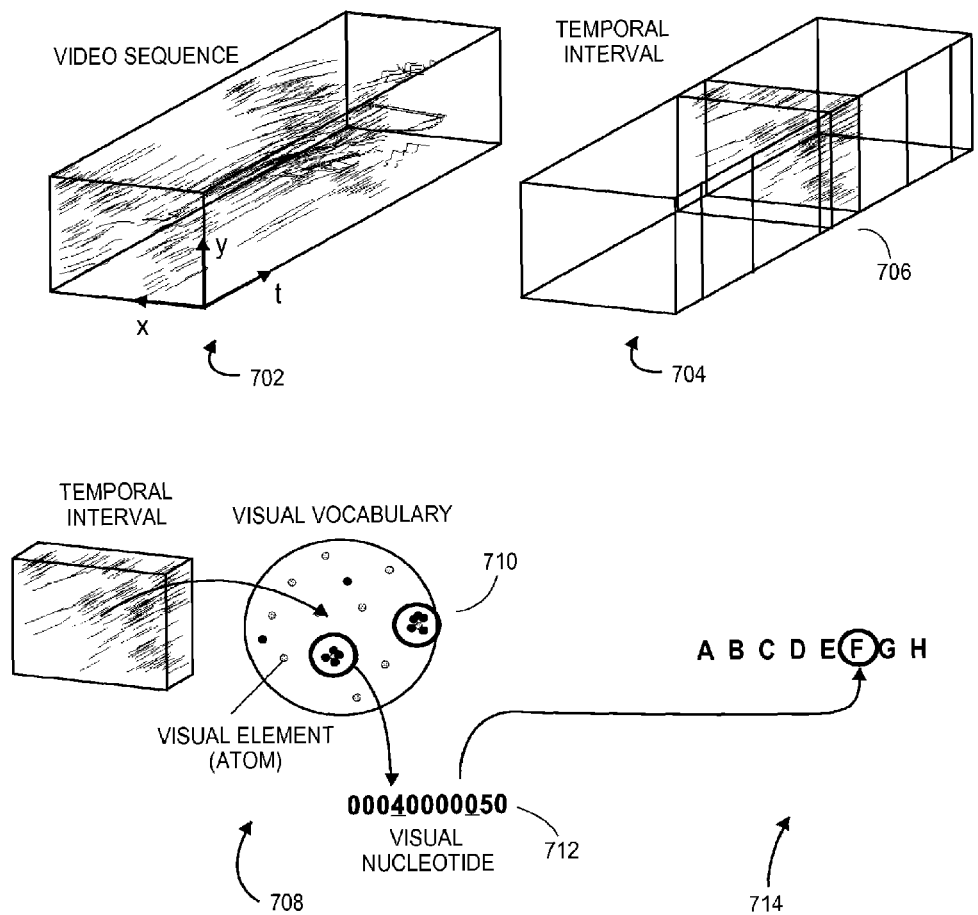
FIG. 7 shows an example procedure for the formation of video DNA.

FIG. 7 presents a conceptual scheme of an example creation of the video map/video DNA representation of a video sequence. The procedure consists of the following stages. At a first stage 702, a local feature detector is used to detect points of interest in the video sequence. Suitable feature detectors include the Harris corner detector disclosed in C. Harris and M. Stephens "A combined corner and edge detector", Alvey Vision Conference, 1988; or the Kanade-Lucas algorithm, disclosed in B. D. Lucas and T. Kanade, "An iterative image registration technique with an application to stereo vision", 1981; or the SIFT scale-space based feature detector, disclosed in D. G. Lowe, "Distinctive image features from scale-invariant keypoints", IJCV, 2004;

The points of interest can be tracked over multiple video frames to prune insignificant or temporally inconsistent (e.g., appearing for a too short of a time period) points. This will be discussed in more detail later. The remaining points are then described using a local feature descriptor, e.g., SIFT based on a local distribution of gradient directions; or Speed up robust features (SURF) algorithm, described in H. Bay, T. Tuytelaars and L. van Gool, "Speed up robust features", 2006. The descriptor is represented as a vector of values.

The feature detection and description algorithms should be designed in such a way that they are robust or invariant to spatial distortions of the video sequence (e.g., change of resolution, compression noise, etc.) The spatio-temporal feature locations and the corresponding feature descriptors constitute the most basic representation level of the video sequence.

At a second stage 704, the video sequence is segmented into temporal intervals 706 which often span multiple individual video frames (often 3 to 30 frames). Such segmentation can be done, for example, based on the feature tracking from the previous stage. It should be noted that the segmentation is ideally designed to be rather invariant to modifications of the video such as frame rate change. Another way is to use time intervals of fixed size with some time overlap. At a third stage 708, the features in each temporal interval are aggregated. As previously discussed, the spatio-temporal locations (feature coordinates) at this stage are not used. Rather, the information in the temporal interval is described using a "bag of features" approach 710.

Here, similar to Sivic and Zisserman, all the feature descriptors are represented using a visual vocabulary (a collection of representative descriptors obtained, for example, by means of vector quantization). Each feature descriptor is replaced by the corresponding closest element in the visual vocabulary. As previously discussed, features represented in this way are also referred to herein as visual atoms. Continuing this analogy, the visual vocabulary can be thought of as a "periodic table" of visual elements.

Unlike the prior art approach of Sivic and Zisserman, however, here we discard the spatial coordinates of the features, and instead represent the frequency of appearance of different visual atoms in the temporal interval as a histogram (group or vector), which is referred to as a "representation", "visual nucleotide", "nucleotide" and occasionally "bag of features" 710. Here a "visual nucleotide 712 is essentially the "bag" of features created by discarding the spatial coordinates and just counting frequency of occurrence (this process is referred to as a "bag function" or "grouping function") that represents a certain number of video frames from the video. If a standardized set of visual elements is used to describe the contents of each "bag", then a visual nucleotide can be represented mathematically as a histogram or sparse vector. For example, if the "bag of features" describing several video images contains 3 cases of feature 1, 2 cases of feature 2, and 0 cases of feature 3, then the visual nucleotide or "bag" that describes these video images can be represented as the histogram or vector (3,2,0). In this example, the visual nucleotide (321) is represented as the histogram or vector (0, 0, 0, 4, 0, 0, 0, 0, 0, 5, 0).

The "bag of features" representation allows for invariance to spatial editing: if the video sequence is modified by, for example, overlaying pixels over the original frames, the new sequence will consist of a mixture of features (one part of old features belonging to the original video and another part of new features corresponding to the overlay). If the overlay is not very significant in size (i.e., most of the information in the frame belongs to the original video), it is possible to correctly match two visual nucleotides by requiring only a certain percentage of feature elements in the respective "bags" (i.e., sparse vectors) to coincide.

Finally, all the visual nucleotides (or feature bags) are aggregated into an ordered sequence referred to as a video map or video DNA 714. Each representation (or visual nucleotide, "bag", histogram or sparse vector) can be thought of as a generalized letter over a potentially infinite alphabet, and thus the video DNA is a generalized text sequence.

The temporal matching of two video sequences can be performed by matching the corresponding video DNAs using a variety of different algorithms. These can range from very simple "match/no match algorithms", to bioinformatics-like "dot matrix" algorithms, to very sophisticated algorithms similar to those used in bioinformatics for matching of biological DNA sequences. Examples of some of these more complex bioinformatics algorithms include the Needleman-Wunsch algorithm, described in S. B Needleman, C. D Wunsch, "A general method applicable to the search for similarities in the amino acid sequence of two proteins", 1970; Smith-Waterman algorithm, described in T. F. Smith and M. S. Waterman, "Identification of common molecular subsequences", 1981; and heuristics such as Basic Local Alignment Search Tool (BLAST), described in S. F. Alschul et al., "Basic Local Alignment Search Tool", 1990.

Often, a suitable sequence matching algorithm will operate by defining a matching score (or distance), representing the quality of the match between two video sequences. The matching score comprises two main components: similarity (or distance) between the nucleotides and gap penalty, expressing to the algorithm the criteria about how critical it is to try not to "tear" the sequences by introducing gaps.

In order to do this, the distance between a nucleotide in a first video and a corresponding nucleotide in a second video must be determined by some mathematical process. That is, how similar is the "bag of features" from the first series of frames of one video similar to the "bag of features" from a second series of frames from a second video? This similarity value can be expressed as a matrix measuring how similar or dissimilar the two nucleotides are. In a simple example, it can be a Euclidean distance or correlation between the vectors (bags of features) representing each nucleotide. If one wishes to allow for partial similarity (which frequently occurs, particularly in cases where the visual nucleotides may contain different features due to spatial edits), a more complicated metric with weighting or rejection of outliers should be used.

More complicated distances may also take into consideration the mutation probability between two nucleotides: two different nucleotides are more likely similar if they are likely to be a mutation of each other. As an example, consider a first video with a first sequence of video images, and a second video with the same first sequence of video images, and a video overlay. Clearly many video features (atoms or elements) in the bag describing the first video will be similar to many video features in the bag describing the second video, and the "mutation" here is those video features that are different because of the video overlay.

The gap penalty is a function accounting for the introduction of gaps between the nucleotides of a sequence. If a linear penalty is used, it is simply given as the number of gaps multiplied by some pre-set constant. More complicated gap penalties may take into consideration the probability of appearance of a gap, e.g., according to statistical distribution of advertisement positions and durations in the content.

The following discussion identifies example similarities and differences between biological DNA and video DNA. Because the systems and methods discussed herein essentially transform the problem of matching corresponding portions of different video media into a problem that bears some resemblance to the problem of matching biological DNA sequences, some insight can be obtained by examining this analogy in more detail. Since DNA sequence matching art is in a comparatively advanced state of development, relative to video matching art, the systems and methods have the unexpected result of showing how a number of advanced DNA bioinformatics methodology techniques can be unexpectedly applied to the very different field of matching video signals.

As previously discussed, at the conceptual level, there is a strong similarity between the structure of biological DNA and the described video DNA methods. A biological DNA is a sequence composed of nucleotides, the same way as video DNA is composed of visual nucleotides (bags of features from multiple video frames). A nucleotide in biology is a molecule composed of atoms from a periodic table, the same way as a visual nucleotide is a bag of features composed of visual atoms (i.e., features) from the visual vocabulary (usually a standardized pallet of different features).

Figure 8:
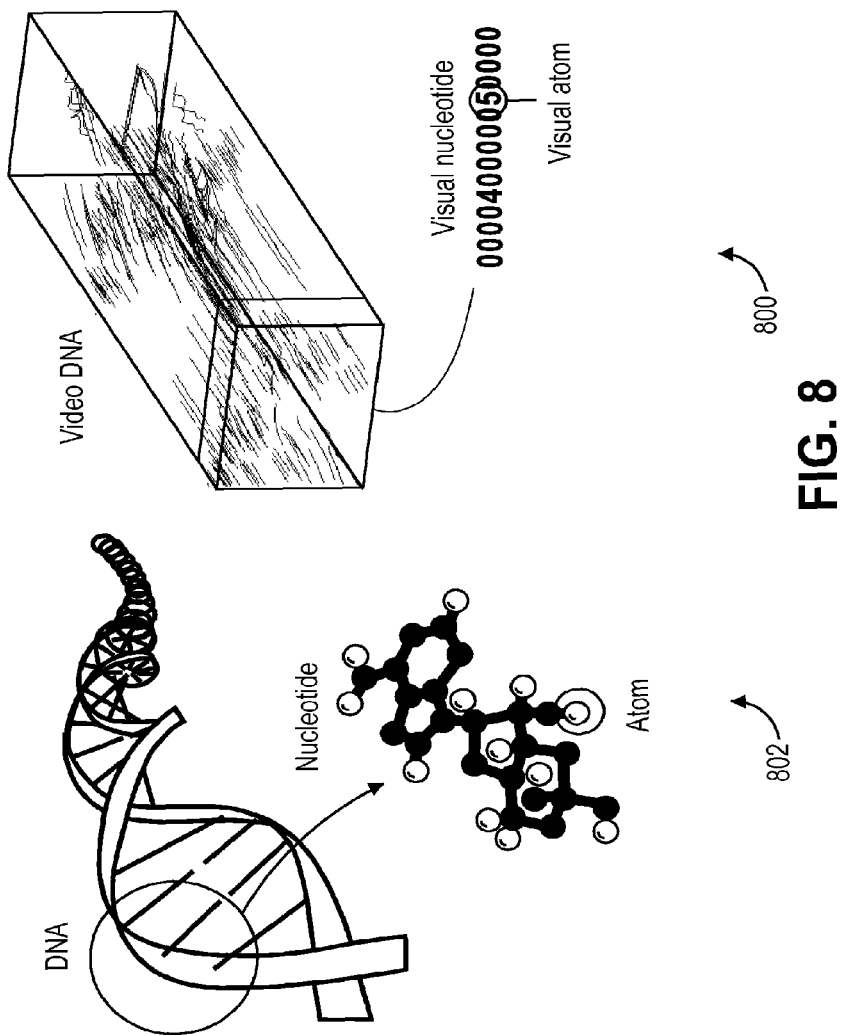
FIG. 8 shows an example comparison between biological DNA and video DNA.

FIG. 8 graphically shows the reason for the name "video DNA" by showing the analogy between an abstracted video signal 800, and the structure of a biological DNA molecule and its constituents (nucleotides and atoms) 802. Despite the conceptual similarity, the are many specific differences between the biological and video DNA. First, the size of the periodic table of atoms that appear in biological molecules is small, usually including only a few elements (e.g., Carbon, Hydrogen, Oxygen, Phosphorous, Nitrogen, etc.) In video DNA, the size of the visual vocabulary of features (atoms) is typically at least a few thousands up to a few millions of visual elements (features). Second, the number of atoms in a typical nucleotide molecule is also relatively small (tens or hundreds). The number of "visual atoms" (features) in a visual nucleotide (bag of features) is typically hundreds or thousands. Whereas in a biological nucleotide, the spatial relationship and relationship between atoms is important, for a video nucleotide, this relationship (i.e., the feature coordinates) between features is deemphasized or ignored.

Third, the number of different nucleotides in biological DNA sequences is small—usually four ("A", "T", "G", "C") nucleotides in DNA sequences and twenty in protein sequences. By contrast, in video DNA, each visual nucleotide is a "bag of features" usually containing at least hundreds of thousands of different features, and which can be represented as a histogram or vector. Thus, if a set or pallet of, for example, 500 or 1000 standardized features is used as a standard video analysis option, each "bag of features" would be a histogram or vector composed of the coefficients of how many times each one of these 500 or 1000 standardized features appeared in the series of video frames described by the "nucleotide" or "bag of features", so the number of permutations of this bag, each of which can potentially represent a different video nucleotide, is huge.

These factual differences make video DNA matching only similar in its spirit to biological sequence matching. In some aspects, the video matching problem is more difficult and in some respects it is easier. More specifically, the matching algorithms are different in the following aspects.

First, in biological sequences, since the number of different nucleotides is small, the score of matching two nucleotides can be represented as a simple "match", "don't match" result. That is, a biological nucleotide can be an "A", "T", "G" or "C", and there either is an "A" to "A" match, or there is not. By contrast, each nucleotide in video DNA is itself an array, histogram, vector or "bag of features" that often will have hundreds or thousands of different coefficients, and thus the matching operation is more complex. Thus, for video DNA, we need to use a more general concept of "score function" or "distance function" between nucleotides. This score can be thought of as some kind of distance function between histograms or vectors. In other words, how far apart are any two different "bags of features"?

Otherwise, many other concepts, such as homology scores, insertions, deletions, point-mutations, and the like have a remarkable resemblance between these two otherwise very different fields.

Figure 9:
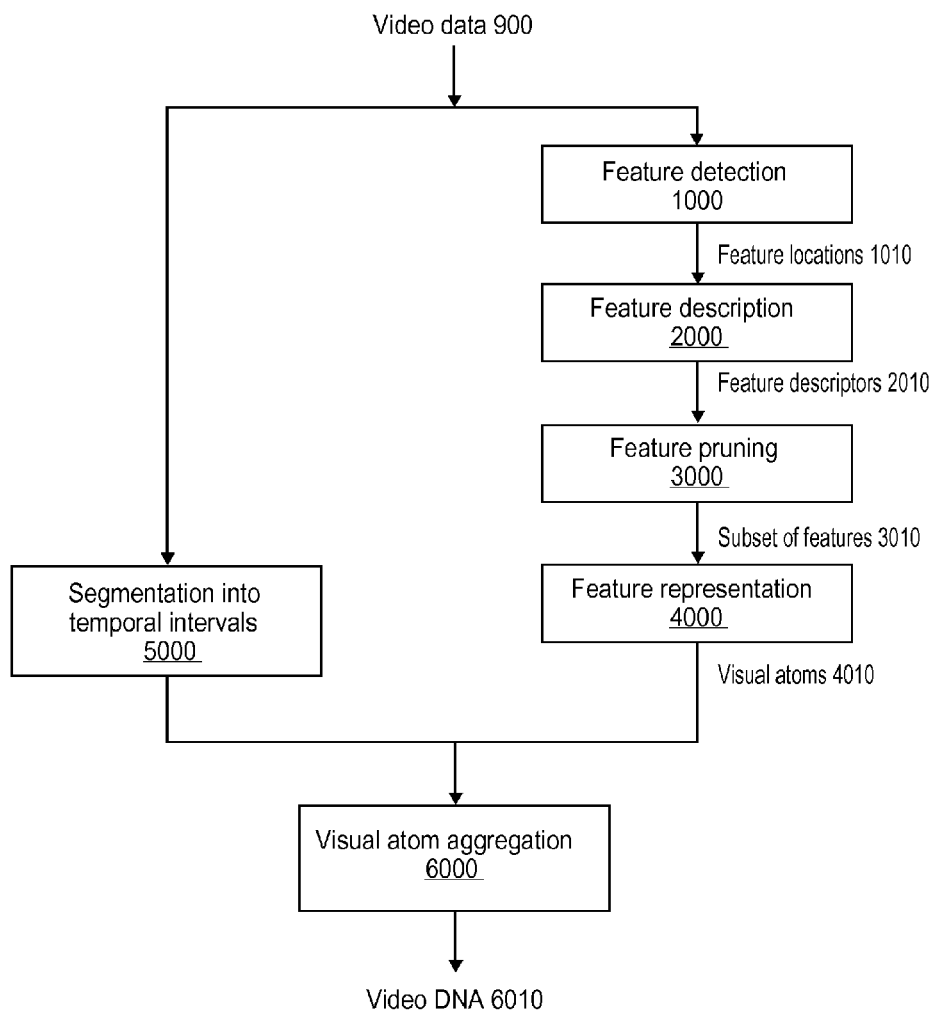
FIG. 9 is a flow diagram showing an embodiment of a procedure for constructing video DNA.

In one embodiment, the video DNA of an input video sequence is computed as depicted in FIG. 9. The process of video DNA computation receives video data 900 and includes the following stages: feature detection 1000, feature description 2000, feature pruning 3000, feature representation 4000, segmentation into temporal intervals 5000 and visual atom aggregation 6000. The output of the process is a video DNA 6010. Some of the stages may be performed in different embodiments or not performed at all. The following description details different embodiments of the above stages of video DNA computation.

As shown in FIG. 10, the video sequence is divided into a set of temporal (time) intervals. FIG. 10 shows that in one embodiment, the video time intervals 1020 are of fixed duration (e.g., 1 second) and non-overlapping. In another embodiment, time intervals 1022 have some overlap. Here each video nucleotide could be composed from as many video frames as are present in one second (or a subset of this), which depending upon frame rate per second might be 10 frames, 16, frames, 24 frames, 30 frames, 60 frames, or some subset of this.

In another embodiment, the intervals are set at the locations of shot (scene) cuts or abrupt transition in the content of two consecutive frames (identified by reference numeral 1024). It is possible to use the result of tracking to determine the shot cuts in the following way: at each frame, the number of tracks disappearing from the previous frame and new tracks appearing in the current frame is computed. If the number of disappearing tracks is above some threshold, and/or the number of new tracks is above some other threshold, the frame is regarded as a shot cut. If shot or scene cuts are used, a video nucleotide could be composed of as many video frames that are in the shot or scene cut, and this could be as high as hundreds or even thousands of video frames if the scene is very long. In another embodiment, the intervals are of constant duration and are resynchronized at each shot cut (identified by reference numeral 1026).

Figure 11:
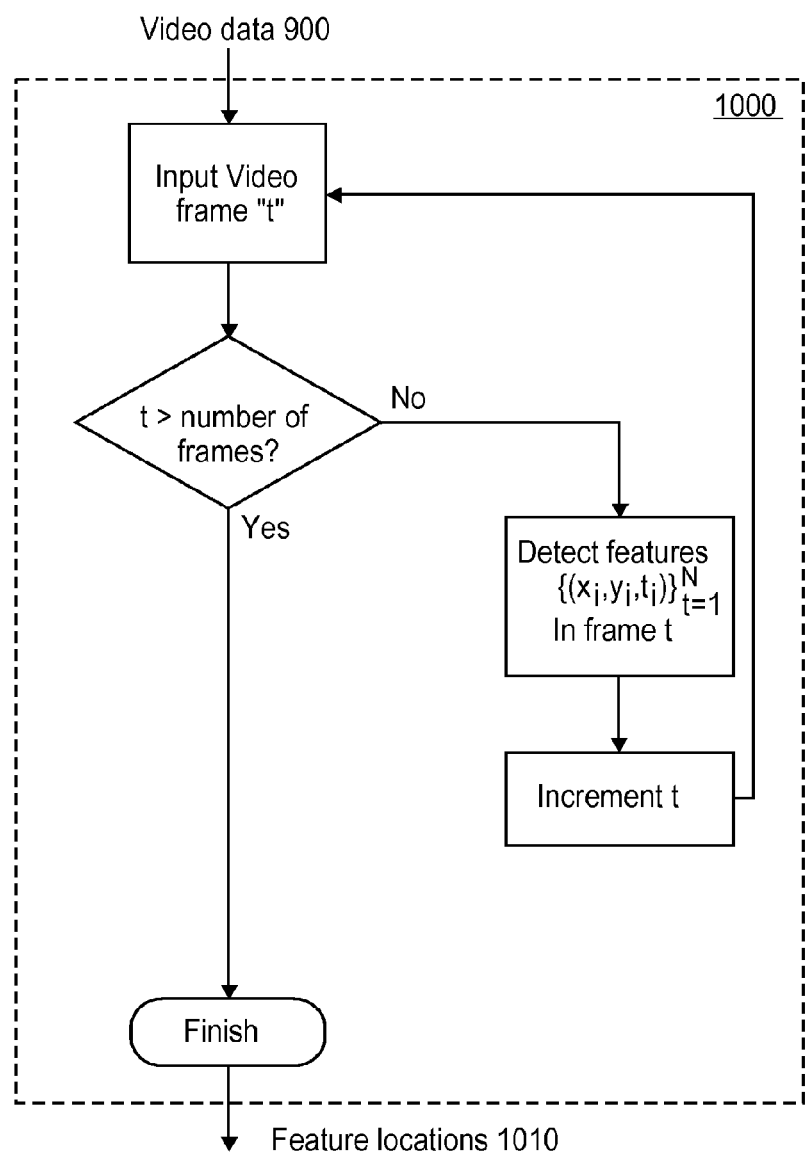
FIG. 11 is a flow diagram showing an embodiment of a procedure for frame based feature detection.

Feature detection (FIG. 9, 1000). A feature detector is operated on the video data 900, producing a set of N invariant feature point locations, $\{(x_i,y_i,t_i)\}_{i=1}^{N}$ (denoted by 1010 in FIG. 9) where x, y and t are the spatial and temporal coordinates of the feature point, respectively. Feature detection step 1000 is shown in more detail in FIG. 11, which shows one embodiment of this method. Feature detection 1000 is performed on a frame basis. For a frame at time t, a set of $N_t$ features $\{(x_i,y_i,t)\}_{i=1}^{N_t}$ is located. Typical features have the form of two-dimensional edges or corners. Standard algorithms for invariant feature point detection described in computer vision literature can be used. Such algorithms may include, for example, the Harris corner detector, scale-invariant feature transform (SIFT), Kanade-Lucas tracker, etc.

Typical values of $N_t$ range between tens to thousands. In particular embodiments, the values of $N_t$=100, 200, ..., 1000 are used. In another embodiment, the value of $N_t$ is pre-set and is a result of feature detection algorithm used. In another embodiment, the feature detection is performed on spatio-temporal data, producing a set $\{(x_i,y_i,t_i)\}_{i=1}^{N}$. Three-dimensional versions of standard feature detection algorithms may be used for this purpose.

Feature description (FIG. 9, 2000). For each feature point detected at feature description stage 2000, a feature descriptor is computed, producing a set of feature descriptors (denoted by 2010 in FIG. 9) $\{f_i\}_{i=1}^{N}$ corresponding to the feature points. A feature descriptor is a representation of the local video information in the neighborhood of the feature point. Many feature descriptors used in computer vision literature (e.g. SIFT or SURF feature descriptors) compute a local histogram of directed edges around the feature point. Typically, a feature descriptor can be represented as a vector of dimension F, i.e., $f_i \in R^F$. For example, for SIFT feature descriptor F=128, and for SURF feature descriptor, F=64.

In a particular embodiment, the feature descriptors are computed on a frame basis, meaning that they represent the pixels in the spatial neighborhood of a feature point within one frame. Standard feature descriptors such as SIFT or SURF can be used in this case. In another embodiment, the feature descriptors are spatio-temporal, meaning that they represent the pixels in the spatio-temporal neighborhood. A three-dimensional generalization of standard feature descriptors can be used in this case.

Feature pruning (FIG. 9, step 3000). At this stage, among all the features, a subset 3010 of consistent features is found. In different embodiments, consistency may imply spatial consistency (i.e., that the feature point does not move abruptly and its position in nearby temporal locations is similar), temporal consistency (i.e., that a feature does not appear or disappear abruptly), or spatio-temporal consistency (a combination of the above).

Figure 12:
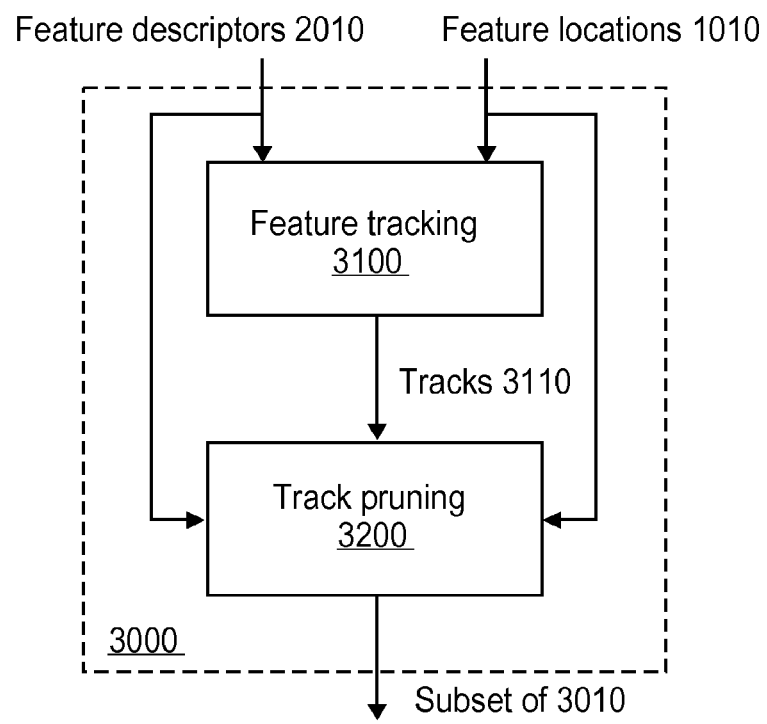
FIG. 12 is a flow diagram showing an embodiment of a procedure for feature tracking to find consistent features.

In one embodiment, tracking is performed for finding consistent features as shown in FIG. 12. A feature tracking algorithm 3100 tries to find sets of features consistently present in a sufficiently large contiguous sequence of frames, thus removing spurious features detected in a single frame. Such spurious features are known to arise, for example, from specular reflections, and their removal improves the accuracy and discriminative power of the description of the visual content in a frame.

In one embodiment, a frame-based tracking is used. This type of tracking tries to find correspondence between two sets of features $\{(x_i,y_i,t)\}_{i=1}^{N_t}$ and $\{(x_j,y_j,t')\}_{j=1}^{N_{t'}}$ in frames t and t', where usually t'=t+1/fps for fps being the frame rate. In another embodiments, tracking is performed between multiple frames at the same time.

The output of the tracker 3100 is a set of T tracks 3110, each track representing a trajectory of a feature through space-time. A track can be represented as a set of indices of feature points belonging to this track. In one of the embodiments, a track is a set of indices of the form $\tau_k = \{(i_t, t)\}_{t=t_1}^{t_2}$, implying that a set of points $\{(x_{i_t}, y_{i_t}, t)\}_{t=t_1}^{t_2}$. $t_1$ and $t_2$ are the temporal beginning and end of the track, and $t_2 - t_1$ is its temporal duration. Determining the tracks may based on feature similarity (i.e., the features belonging to the track have similar descriptors), motion (i.e., the locations of the feature points do not change significantly along the track), or both. Standard algorithms for feature tracking used in computer vision literature can be used.

The consistency of the resulting tracks is checked and track pruning 3200 is performed. In one embodiment, tracks of duration below some threshold are pruned. In another embodiment, tracks manifesting high variance of spatial coordinate (abrupt motions) are pruned. In another embodiment, tracks manifesting high variance of feature descriptors of feature points along them are pruned. The result of pruning is a subset T' of the tracks, $\{\tau_k'\}_{k'=1}^{T'}$.

In one of the embodiments, a set of features $\{(x_i, y_i, t)\}_{i=1}^{N}$ and the corresponding descriptors $\{f_i\}_{i=1}^{N}$ are computed in the beginning of a shot t, and the tracker is initialized to $x_i(t) = x_i$, $y_i(t) = y_i$, and a Kalman filter is used to predict the feature locations $\hat{x}_i(t')$, $\hat{y}_i(t')$ in the next frame t'. The set of features with $\{(x'_j, y'_j, t')\}_{j=1}^{N'}$ the corresponding descriptors $\{f'_j\}_{j=1}^{N'}$ computed in the frame t+dt. Each feature $x_i$, $y_i$, $f_i$ is matched against the subset of the features $x'_j$, $y'_j$, $f'_j$ in a circle with a certain radius centered at $\hat{x}_i(t')$, $\hat{y}_i(t')$, and the match with the closest descriptor is selected. When no good match is found for a contiguous sequence of frames, the track is terminated. Only features belonging to tracks of sufficient temporal duration are preserved.

In one embodiment, the Kalman filter is used with a constant velocity model, and the estimated feature location covariance determines the search radius in the next frame.

Figure 13:
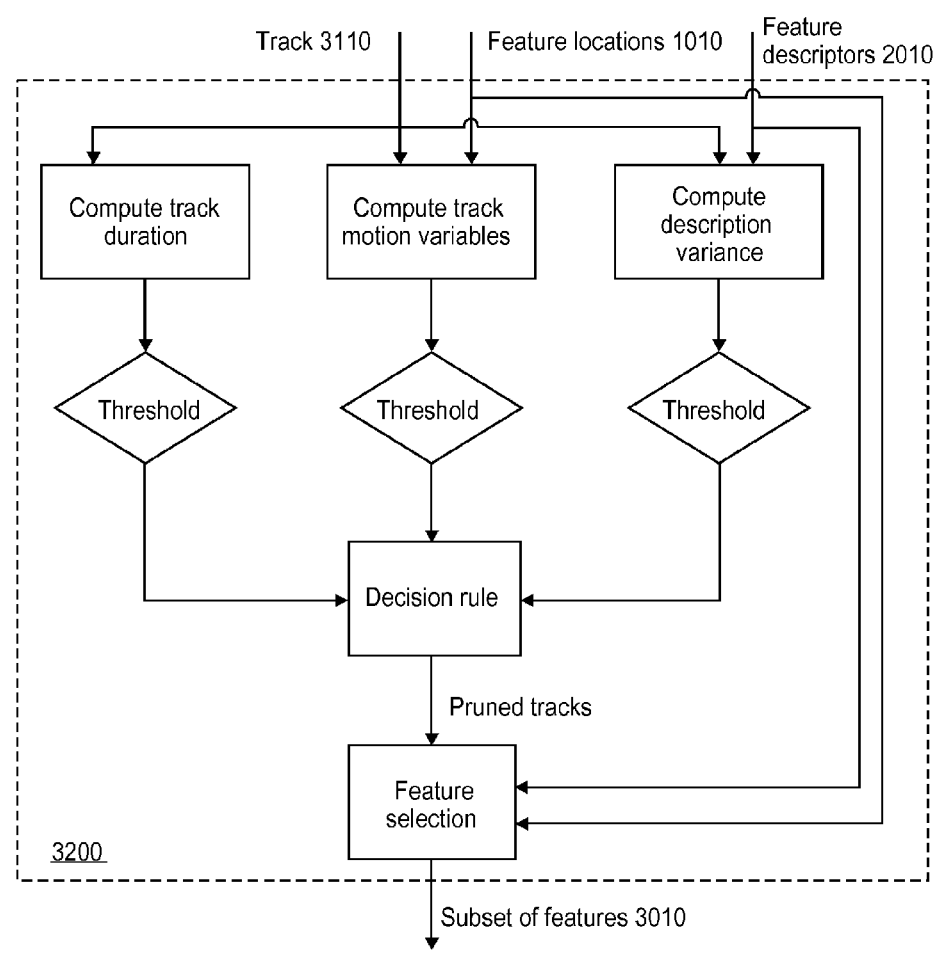
FIG. 13 is a flow diagram showing an embodiment of a procedure for feature track pruning.

One of the embodiments of feature pruning based on tracking previously shown in FIG. 12 (block 3200) is shown in more detail in FIG. 13. Inputting the feature locations 1010, corresponding feature descriptors 2010 and tracks of features 3110, for each track, the track duration "d", motion variance "mv" and descriptor variance "dv" are computed. These values go through a set of thresholds and a decision rule, rejecting tracks with too small duration and too large variance. The results is a subset of features 3010 belonging to tracks that survived the pruning.

One of the possible decision rules leaving the track is expressed as:

(d>th_d) AND (mv<th_mv) AND (dv<th_dv), where th_d is a duration threshold, th_mv is the motion variance threshold, and th_dv is the descriptor variance threshold.

Feature representation (FIG. 9, block 4000): Returning to FIG. 9, block 4000 shows the features on tracks remaining after pruning undergo representation using a visual vocabulary. The result of this stage is a set of visual atoms 4010. The visual vocabulary is a collection of K representative feature descriptors (visual elements), denoted here by $\{e_l\}_{l=1}^{K}$. The visual vocabulary can be pre-computed, for example, by collecting a large number of features in a set of representative video sequences and performing vector quantization on their descriptors. In different embodiments, values of K=1000, 2000, 3000, ..., 1000000 are used.

Each feature i is replaced by the number l of the element from the visual vocabulary which is the closest to the descriptor of feature i. In one of the embodiments, a nearest neighbor algorithm is used to find the representation of feature i, $$l = \underset{l=1,\ldots,K}{\operatorname{argmin}} \|f_i - e_l\|,$$

where $\|\bullet\|$ is a norm in the descriptor space. In another embodiment, an approximate nearest neighborhood algorithm is used. As a result, feature i is represented as $(x_i, y_i, l_i)$, referred to as a visual atom.

In one embodiment, prior to representation of feature in a visual vocabulary, for each track a representative feature is found. It can be obtained by taking a mean, median or majority vote of the descriptors of the features along a track. In one of the embodiments, non-discriminative features are pruned. A non-discriminative feature is such a feature which is approximately equally distant from multiple visual atoms. Such features can be determined by considering the ratio between the distance from the first and second closest neighbor.

Visual atom aggregation (6000): For each temporal interval computed at FIG. 9 block 5000, the visual atoms within it are aggregated into visual nucleotides. The resulting sequence of visual nucleotides (video DNA 6010) is the output of the process. A visual nucleotide s is created as a histogram with K bins (K being the visual vocabulary size), nth bin counting the number of visual atoms of type n appearing in the time interval.

In one embodiment, the histogram in the interval $[t_s, t_e]$ is weighted by the temporal location of a visual atom within an interval according to the formula $$h_n = \sum_{i: l_i = n} w(t_i - t_s)$$

where w(t) is a weight function, and $h_n$ is the value of the nth bin in the histogram. In one embodiment, the weight is set to its maximum value in the center of the interval, decaying towards interval edges, e.g. according to the Gaussian formula $$w(t) = \exp\left(-\frac{t^2}{2\sigma^2(t_e - t_s)^2}\right).$$

In another embodiment, shot cuts withing the interval $[t_s, t_e]$ are detected, and w(t) is set to zero beyond the boundaries of the shot to which the center $\frac{1}{2}(t_s + t_e)$ of the interval belongs.

In a particular embodiment, the bins of the histogram are further weighted in order to reduce the influence of unreliable bins. For example, the weight of the nth bin is inversely proportional to the typical frequency of the visual atom of type n. This type of weighting is analogous to inverse document frequency (tf-idf) weighting in text search engines.

In another embodiment, the weight of the nth bin is inversely proportional to the variance of the nth bin computed on representative under typical mutations and directly proportional to the variance of the nth bin on the same content.

Once the video DNA has been computed for at least two video sequences, these different video sequences can then be matched (aligned) as to time, as described below. In one embodiment, the temporal correspondence between the query video DNA represented as the sequence $\{q_i\}_{i=1}^M$ of visual nucleotides, and a video DNA from the database represented as the sequence $\{s_j\}_{j=1}^N$ of visual nucleotides is computed in the following way.

In a matching between the two sequences, a nucleotide $q_i$ is brought into correspondence either with a nucleotide $s_j$, or with a gap between the nucleotides $s_j$ and $s_{j+1}$, and, similarly, a nucleotide $s_j$ is brought into correspondence either with a nucleotide $q_i$, or with a gap between the nucleotides $q_i$ and $q_{i+1}$. A matching between $\{q_i\}_{i=1}^M$ and $\{s_j\}_{j=1}^N$ can be therefore represented as a sequence of K correspondences $\{(i_k, j_k)\}_{k=1}^K$, a sequence of G gaps $\{(i_m, j_m, l_m)\}_{m=1}^G$, where $(i_m, j_m, l_m)$ represents the gap of length $l_m$ between the nucleotides $s_{j_m}$ and $s_{j_m+1}$ to which the sub-sequence $\{q_{i_m}, q_{i_m+1}, \ldots, q_{i_m+l_m}\}$ corresponds, and a sequence of G' gaps $\{(i_n, j_n, l_n)\}_{n=1}^{G'}$ where $(i_n, j_n, l_n)$ represents the gap of length $l_n$ between the nucleotides $q_{i_n}$ and $q_{j_{n+1}}$, to which the sub-sequence $\{s_{j_n}, s_{j_n+1}, \ldots, s_{j_n+l_n}\}$ corresponds. A match is assigned a score according to the formula $$S = \sum_{k=1}^{K} \sigma(q_{i_k}, s_{j_k}) + \sum_{m=1}^{G} g(i_m, j_m, l_m) + \sum_{n=1}^{G'} g(i_n, j_n, l_n)$$

where $\sigma(q_{i_k}, s_{j_k})$ quantifies the score of the nucleotide $q_{i_k}$ corresponding to the nucleotide $s_{j_k}$, and $g(i_m, j_m, l_m)$ is the gap penalty.

As previously discussed, many alternative algorithms may be used to compute matching, ranging from simple to extremely complex. In one embodiment of the invention, the Needleman-Wunsch algorithm is used to find the matching by maximizing the total score S. In another embodiment, the Smith-Waterman algorithm is used. In yet another embodiment, the BLAST algorithm is used.

In an alternate embodiment, the matching maximizing the total score S is done in the following way. In the first stage, good matches of a small fixed length W between the query and sequence in the database are searched for. These good matches are known as seeds. In the second stage, an attempt is made to extend the match in both directions, starting at the seed. The ungapped alignment process extends the initial seed match of length W in each direction in an attempt to boost the alignment score. Insertions and deletions are not considered during this stage. If a high-scoring un-gapped alignment is found, the database sequence passes on to the third stage. In the third stage, a gapped alignment between the query sequence and the database sequence can be performed using the Smith-Waterman algorithm.

In one embodiment of the invention, the gap penalty is linear, expressed by $g(i_d, j_m, l_m) = \alpha l_m$ where $\alpha$ is a parameter. In another embodiment, the gap penalty is affine, expressed by $g(i_m, j_m, l_m) = \beta + \alpha(l_m - 1)$ where $\beta$ is another parameter.

In an embodiment, the score function $\sigma(q_{i_k}, s_{j_k})$ describes the similarity between the histogram h representing the nucleotide $q_{i_k}$ and the histogram h' representing the nucleotide $s_{j_k}$. In another embodiment, the similarity is computed as the inner product $\langle h, h' \rangle$. In alternate embodiments, the inner product is weighted by a vector of weight computed from training data to maximize the discriminative power of the score function. Alternatively, the score function $\sigma(q_{i_k}, s_{j_k})$ is inversely proportional to the distance between the histogram h representing the nucleotide $q_{i_k}$ and the histogram h' representing the nucleotide $s_{j_k}$. In other embodiments, the distance is computed as the Lp norm $$\|h - h'\|_p = \left(\sum_n (h_n - h'_n)^p\right)^{1/p}.$$

In a specific embodiment, the distance is the Kullback-Leibler divergence between the histograms. In other embodiments, the distance is the earth mover's distance between the histograms.

In a particular implementation, the score function $\sigma(q_{i_k}, s_{j_k})$ is proportional to the probability of a nucleotide $s_{j_k}$ mutating into a nucleotide $q_{i_k}$ by a spatial or temporal distortion applied to the underlying video sequence. This, in turn, can be expressed as the probability of the histogram h representing the nucleotide $q_{i_k}$ being the mutation of the histogram h' representing the nucleotide $s_{j_k}$.

In one example, the probability is estimated as $$P(h \mid h') = \prod_n P(h_n \mid h'_n),$$

where $P(h_n \mid h'_n)$ is the probability that the nth bin of the histogram h' changes its value to $h_n$. The probabilities $P(h_n \mid h'_n)$ are measured empirically on the training data, independently for each bin.

In another example, the Bayes theorem is used to represent the score function $\sigma(q_{i_k}, s_{j_k})$ as the probability $$P(h' \mid h) = \frac{P(h \mid h') P(h')}{P(h)}$$

where $P(h \mid h')$ is computed as explained previously, and $P(h)$ and $P(h')$ are expressed as $$P(h) = \prod_n P_n(h_n)$$

$$P(h') = \prod_n P_n(h'_n)$$

where $P_n(h_n)$ measures the probability of the nth bin of the histogram h assuming the value of $h_n$, and is estimated empirically from the training data, independently for each bin.

Often it is useful not only to find the overall frame or time alignment between two different videos, but also to find the alignment between a first "thing" (group of pixels) in one spatial alignment in one video, and a second corresponding "thing" with a second spatial alignment in a second video. Alternatively, sometimes it is useful to compare videos that have been taken with different orientations and resolutions. For example, a user photographing a television screen using a handheld video taken with a cell phone may wish to determine exactly what television show or movie was being played. In both cases, it is useful to determine the spatial alignment between two different videos, as well as the time (frame number) alignment.

In one embodiment of the present invention, the spatial correspondence between the visual nucleotide $q_i$ representing the temporal interval $[t_s, t_e]$ in the query sequence, and the best matching visual nucleotide $s_j$ representing the temporal interval $[t'_s, t'_e]$ in the database sequence is computed in the following way.

In this embodiment, a frame is picked out of the interval $[t_s, t_e]$ and represented as a set of features $\{x_i, y_i\}_{i=1}^N$ with the corresponding descriptors $\{f_i\}_{i=1}^N$. Another frame is picked out of the interval $[t'_s, t'_e]$ and represented as a set of features $\{x'_j, j'_j\}_{j=1}^{N'}$ with the corresponding descriptors $\{f'_j\}_{j=1}^{N'}$. A correspondence is found between the two sets in such a way that each $f_i$ is matched to the closest $f_j$. Insufficiently close matches are rejected. The corresponding points are denoted by $\{x_{i_k}, y_{i_k}\}$, $\{x'_{j_k}, y'_{j_k}\}$.

Once this correspondence is found, a transformation T is found by minimizing $$\min_T \|T(x_{i_k}, y_{i_k}) - (x'_{j_k}, y'_{j_k})\|.$$

In one embodiment, the minimization is performed using a RANSAC (random sample consensus) algorithm. In another embodiment, the minimization is performed using the iteratively-reweighted least squares fitting algorithm. Often it will be useful to perform rotation, size, or distortion transformations.

In one of the embodiments, the transformation T is of the form $$T = \begin{pmatrix} \cos\theta & \sin\theta & u \\ -\sin\theta & \cos\theta & v \\ 0 & 0 & 1 \end{pmatrix}.$$

In another embodiment, the transformation T is of the form $$T = \begin{pmatrix} \cos\theta & \sin\theta & u \\ -\alpha\sin\theta & \alpha\cos\theta & v \\ 0 & 0 & 1 \end{pmatrix}.$$

In another embodiment, the transformation T is of the form $$T = \begin{pmatrix} a & b & u \\ c & d & v \\ 0 & 0 & 1 \end{pmatrix}.$$

In another embodiment, the transformation T is a projective transformation.

Figure 14:
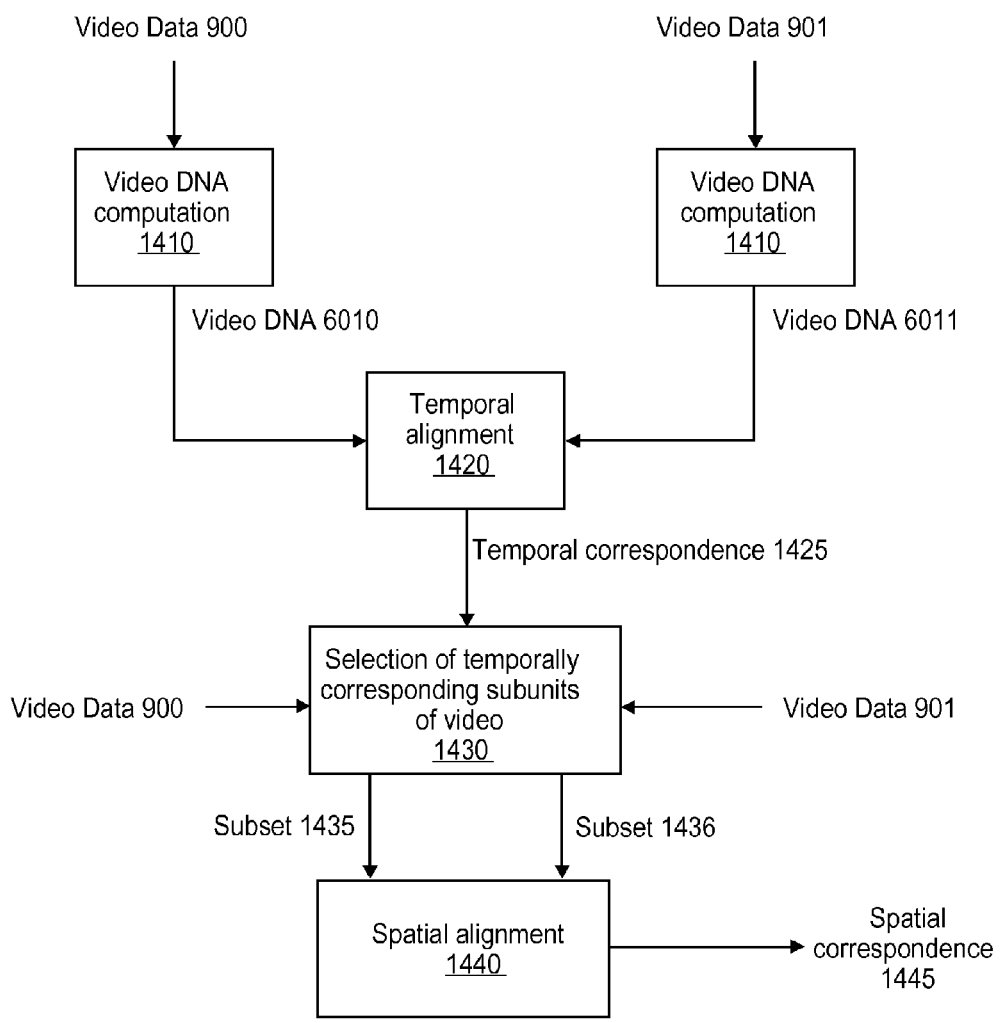
FIG. 14 is a flow diagram showing an embodiment of a procedure for finding spatio-temporal correspondence between two video DNA sequences.

Finding of spatio-temporal correspondence between two sequences is depicted in FIG. 14. The process consists of the following stages:

1. Video DNA computation. Two sets of video data 900 and 901 are inputted into a video DNA computation stage 1410. Stage 1410 was shown in more detail in FIG. 9 as steps 1000, 2000, 3000 and 4000. This stage can be performed on-line, or pre-computed and stored.

2. Temporal matching. The resulting video DNAs 6010 and 6011 are inputted into a temporal alignment stage 1420, which computes a temporal correspondence 1425. The temporal correspondence is essentially a transformation from the temporal system of coordinates of the video data 900, and that of the video data 901.

3. Spatial matching. The temporal correspondence 1425 is used at stage 1430 of selection of temporally corresponding subsets of the video data 900 and 901. The selected subsets 1435 and 1436 of the video data 900 and 901, respectively, are inputted to a spatial alignment stage 1440, which computes a spatial correspondence 1445. The spatial correspondence is essentially a transformation from the spatial system of coordinates of the video data 900, and that of the video data 901.

A particular example is discussed below, in which the video DNA of an input video sequence is computed as depicted in FIG. 9. The process of video DNA computation inputs video data 900 and includes the following stages: feature detection 1000, feature description 2000, feature pruning 3000, feature representation 4000, segmentation into temporal intervals 5000 and visual atom aggregation 6000. The output of the process is a video DNA 6010.

Feature detection 1000: A SURF feature detector (described in "Speeded Up Robust Features", Proceedings of the 9th European Conference on Computer Vision, May 2006) is operated independently on each frame of the video sequence 900, producing a set of $N_f=150$ strongest invariant feature point locations (denoted by 1010 in FIG. 9) per each frame "t".

Feature description 2000: For each feature point detected at feature detection stage 1000, a 64-dimensional SURF feature descriptor is computed, as described in described in "Speeded Up Robust Features", Proceedings of the 9th European Conference on Computer Vision, May 2006.

Feature pruning 3000: This is an optional step which is not performed in this example.

Feature representation 4000: The features are represented in a visual vocabulary consisting of K=1000 entries. The representative elements are computed using the approximate nearest neighbor algorithm described in S. Arya and D. M. Mount, "Approximate Nearest Neighbor Searching", Proc. 4th Ann. ACM-SIAM Symposium on Discrete Algorithms (SODA '93), 1993, 271-280. Only features whose distance to the nearest neighbor is below 90% of the distance to the second nearest neighbor are kept. The result of this stage is a set of visual atoms 4010.

The visual vocabulary for the feature representation stage is pre-computed from a sequence of 750,000 feature descriptors obtained by applying the previously described stages to a set of assorted visual context serving as the training data. A k-means algorithm is used to quantize the training set into 1000 clusters. In order to alleviate the computational burden, the nearest neighbor search in the k-means algorithm is replaced by its approximate variant as described in S. Arya and D. M. Mount, "Approximate Nearest Neighbor Searching", Proc. 4th Ann. ACM-SIAM Symposium on Discrete Algorithms (SODA '93), 1993, 271-280.

Segmentation into temporal intervals 5000: The video sequence is divided into a set of fixed temporal intervals of fixed duration of 1 sec, (see FIG. 10, reference numeral 1020).

Visual atom aggregation 6000: For each temporal interval computed at stage 5000, the visual atoms within it are aggregated into visual nucleotides. The resulting sequence of visual nucleotides (video DNA 6010) is the output of the process. A visual nucleotide is created as a histogram with K=1000 bins, nth bin counting the number of visual atoms of type n appearing in the time interval.

After the video DNA for two different or more different videos is produced, the video DNA from these materials may then be checked for correspondence, and matched as follows:

Temporal matching (see FIG. 14, reference numeral 1420) can be performed using the SWAT (Smith-Waterman) algorithm with an affine gap penalty with the parameters $\alpha=5$ and $\beta=3$. The weighted score function is used $$\sigma(h, h') = \frac{\sum_{n=1}^{1000} h_n w_n h'_n}{\sqrt{\sum_{n=1}^{1000} w_n (h_n)^2} \sqrt{\sum_{n=1}^{1000} w_n (h'_n)^2}}$$

The weights $w_n$ can be computed empirically. For that purpose, various training video sequences can be transformed using a set of random spatial and temporal deformations, including blurring, resolution, aspect ratio, and frame rate changes, and its video DNA can be computed. The variance of each bin in the visual nucleotides, as well as the variance each bin in the corresponding visual nucleotides under the deformations are estimated. For each bin n, the weight $w_n$ is set to be ratio between the latter two variances.

Spatial matching (see FIG. 14, reference numeral 1440): The spatial alignment can be done between two 1 sec corresponding intervals of features representing the two sets of video data 900 and 901, where the correspondence is obtained from the previous temporal alignment stage 1420. For each feature in one interval, the corresponding feature in the other interval is found by minimizing the Euclidean distance between their respective descriptors. The output of the process is two sets of corresponding features $\{(x_i, y_i, t_i)\}$, $\{(x'_i, y'_i, t'_i)\}$ Once the correspondence is found, a transformation of the form $$T = \begin{pmatrix} a & b & u \\ -b & c & v \\ 0 & 0 & 1 \end{pmatrix}$$

can be found between the corresponding sets using the RANSAC algorithm.

Another way to view the at least one aspect of the invention is that it is a method of spatio-temporal matching of digital video data that includes multiple temporally matching video frames. In this view, the method consists of the steps of performing temporal matching on the digital video data that includes the plurality of temporally matching video frames to obtain a similarity matrix, where the spatial matching represents each of the video frames using a representation that includes a matching score, a similarity component, and a gap penalty component, and the representation is operated upon using a local alignment algorithm (such as one based upon a bioinformatics matching algorithm, or other suitable algorithm); and performing spatial matching on the digital video data that includes the plurality of temporally matching video frames obtained using the similarity matrix. Here the step of performing spatial matching is substantially independent from the step of performing temporal matching.

The above method could use a Needleman-Wunsch algorithm, a Smith-Waterman algorithm or similar type of algorithm. The above method can be also be implemented with a bioinformatics matching algorithm such as a basic local alignment search tool used to compare biological sequences or a protein or nucleotides DNA sequencing like algorithm.

The above method may further include performing local feature detection on the digital video data that includes the plurality of temporally matching video frames to detect points of interest; and using the points of interest to segment the digital video data that includes the plurality of temporally matching video frames into a plurality of temporal intervals; and wherein the step of performing temporal matching and performing spatial matching operate upon the plurality of temporal intervals.

In another aspect, the method may determine spatio-temporal correspondence between video data, and include steps such as: inputting the video data; representing the video data as ordered sequences of visual nucleotides; determining temporally corresponding subsets of video data by aligning sequences of visual nucleotides; computing spatial correspondence between temporally corresponding subsets of video data; and outputting the spatio-temporal correspondence between subsets of the video data.

Types of input data: With respect to this other aspect the video data may be a collection of video sequences, and can also be query of video data and corpus video data, and can also comprise subsets of a single video sequence or modified subsets of a video sequence from the corpus video data. Still further, the spatio-temporal correspondence can be established between at least one of the subsets of at least one of the video sequences from the query video data and at least one of subsets of at least one of the video sequences from the corpus video data. In a specific implementation, the spatio-temporal correspondence can be established between a subset of a video sequence from the query video data and a subset of a video sequence from the corpus video data.

With respect to the query video data mentioned above, the query can contain modified subsets of the corpus video data, and the modification can be a combination of one or more of the following
 frame rate change;
 spatial resolution change;
 non-uniform spatial scaling;
 histogram modification;
 cropping;
 overlay of new video content;
 temporal insertion of new video content.

Nucleotide segmentation: In another variation, the described systems and methods can also have the video data which are segmented into temporal intervals, and one visual nucleotide can be computed for each interval.

Interval duration: In another variation, the described systems and methods can also segment the video data into temporal intervals of constant duration or temporal intervals of variable duration. Temporal interval start and end times can also be computed according to the shot transitions in the video data. It is also noted that the temporal intervals may be non-overlapping or overlapping.

Visual nucleotide computation: In another variation, the visual nucleotide (the term used, as mentioned previously, to describe the visual content in a temporal interval of the video data) can also be computed using the following steps:
 representing a temporal interval of the video data as a collection of visual atoms;
 constructing the nucleotide as a function of at least one of the visual atoms.

With respect to this computation, the function may be a histogram of the appearance frequency of the features (visual atoms) in the temporal interval, or the function may be a weighted histogram of the appearance frequency of visual atoms in the temporal interval. If a weighted histogram, then the weight assigned to a visual atom can be a function of a combination of the following:
 the temporal location of the visual atom in the temporal interval;
 the spatial location of the visual atom in the temporal interval;
 the significance of the visual atom.

Relative weight of different features or visual atoms in the nucleotide or "bag of features": In one implementation, the weight is constant over the interval (i.e., all features are treated the same). However in other implementations, the features may not all be treated equally. For example, in an alternative weighting scheme, the weight can be a Gaussian function with the maximum weight being inside the interval. The weight can also be set to a large value for the visual content belonging to the same shot as the center of the interval, and to a small value for the visual content belonging to different shots. Alternatively, the weight can be set to a large value for visual atoms located closer to the center of the frame, and to a small value for visual atoms located closer to the boundaries of the frame.

Visual atom methods: As described previously, the visual atom describes the visual content of a local spatio-temporal region of the video data. In one implementation, representing a temporal interval of the video data as a collection of visual atoms can include the following steps:
- detecting a collection of invariant feature points in the temporal interval;
- computing a collection of descriptors of the local spatio-temporal region of the video data around each invariant feature point;
- removing a subset of invariant feature points and their descriptors;
- constructing a collection of visual atoms as a function of the remaining invariant feature point locations and descriptors.

Feature detection methods: In addition to the feature detection methods previously described, the collection of invariant feature points in the temporal interval of the video data mentioned above may be computed using the Harris-Laplace corner detector or using the affine-invariant Harris-Laplace corner detector or using the spatio-temporal corner detector or using the MSER algorithm. If the MSER algorithm is used, it can be applied individually to a subset of frames in the video data or can be applied to a spatio-temporal subset of the video data. The descriptors of the invariant feature points mentioned above can also be SIFT descriptors, spatio-temporal SIFT descriptors, or SURF descriptors.

Tracking methods: In some embodiments, computing a collection of descriptors mentioned above can include: tracking of corresponding invariant feature points in the temporal interval of the video data, using methods such as:
- computing a single descriptor as a function of the descriptors of the invariant feature points belonging to a track;
- assigning the descriptor to all features belonging to the track.

This computing the function may be the average of the invariant feature points descriptors or the median of the invariant feature points descriptors.

Feature pruning methods: In some embodiments, removing a subset of invariant feature points as mentioned above can include:
- tracking of corresponding invariant feature points in the temporal interval of the video data;
- assigning a quality metric for each track;
- removing the invariant feature points belonging to tracks whose quality metric value is below a predefined threshold.

In some embodiments, the quality metric assigned for a track as mentioned above may be a function of a combination of the following
- descriptor values of the invariant feature points belonging to the track;
- locations of the invariant feature points belonging to the track.

The function may be proportional to the variance of the descriptor values or to the total variation of the invariant feature point locations.

Visual atom construction: In some embodiments, constructing a collection of visual atoms mentioned above may also be performed by constructing a single visual atom for each of the remaining invariant feature points as a function of the invariant feature point descriptor. The function computation may include:
- receiving an invariant feature point descriptor as the input;
- finding a representative descriptor from an ordered collection of representative descriptors matching the best the invariant feature point descriptor received as the input;
- outputting the index of the found representative descriptor.

Finding a representative descriptor may be performed using a vector quantization algorithm or using an approximate nearest neighbor algorithm.

Visual vocabulary methods: The ordered collection of representative feature descriptors (visual vocabulary) may be fixed and computed offline from training data, or may be adaptive and updated online from the input video data. In some cases, it will be useful to construct a standardized visual vocabulary that operates either universally over all video, or at least over large video domains, so as to facilitate standardization efforts for large video libraries and a large array of different video sources.

Visual atom pruning methods: In some embodiments, constructing the collection of visual atoms mentioned above may be followed by removing a subset of visual atoms, and removing a subset of visual atoms may include:
- assigning a quality metric for each visual atom in the collection;
- removing the visual atoms whose quality metric value is below a predefined threshold.

The threshold value may be fixed or adapted to maintain a minimum number of visual atoms in the collection or adapted to limit the maximum number of visual atoms in the collection. Further, the assigning the quality metric may include:
- receiving a visual atom as the input;
- computing a vector of similarities of the visual atom to visual atoms in a collection of representative visual atoms;
- outputting the quality metric as a function of the vector of similarities. This function may be proportional to the largest value in the vector of similarities, proportional to the ratio between the largest value in the vector of similarities and the second-largest value in the vector of similarities or a function of the largest value in the vector of similarities and the ratio between the largest value in the vector of similarities and the second-largest value in the vector of similarities.

Sequence alignment methods: In some embodiments, the aligning sequences of visual nucleotides mentioned above may include
- receiving two sequences of visual nucleotides $s=\{s_1, \ldots, s_M\}$ and $q=\{q_q, \ldots, q_M\}$ as the input;
- receiving a score function $\sigma(s_i, q_j)$ and a gap penalty function $\gamma(i, j, n)$ as the parameters;
- finding the partial correspondence $C=\{(i_1, q_j), \ldots, (i_K, j_K)\}$ and the collection of gaps $G=\{(l_1, m_1, n_1), \ldots, (l_L, m_L, n_L)\}$ maximizing the functional $$F(C, G) = \sum_{k=1}^{K} \sigma(S_{i_k}, q_{j_k}) + \sum_{k=1}^{L} \gamma(l_k, m_k, n_k)$$

outputting the found partial correspondence C and the maximum value of the functional.

Other alignment methods: As previously discussed, the maximization may be performed using the Smith-Waterman algorithm, the Needleman-Wunsch algorithm, the BLAST algorithm or may be performed in a hierarchical manner.

Scoring methods: The score function mentioned above may be a combination of one or more functions of the form $$S_i^T A q_j;$$

$$\frac{S_i^T A q_j}{\sqrt{S_i^T A s_i} \sqrt{q_j^T A q_j}}.$$

wherein A may be an identity matrix, a diagonal matrix.

The score may also be proportional to the conditional probability $P(q_j|s_i)$ of the nucleotide $q_j$ being a mutation of the nucleotide $s_i$ and the mutation probability may be estimated empirically from training data.

The score may also be proportional to the ratio of probabilities $$\frac{P(q_j \mid s_i) P(s_i)}{P(q_j)}$$

and the mutation probability may be estimated empirically from training data.

Distance based scoring methods: Further, the score function may be inversely proportional to a distance function $d(s_i, q_j)$, and the distance function may be a combination of at least one of the following
  L1 distance;
  Mahalanobis distance;
  Kullback-Leibler divergence;
  Earth Mover's distance.

Weighting schemes: In addition to the weighting schemes previously described, the diagonal elements of the matrix A may be proportional to $$\log \frac{1}{E_i}$$

where $E_i$ denotes the expected number of times that a visual atom i appears in a visual nucleotide. $E_i$ may be estimated from training video data or from the input video data. And the diagonal elements of the matrix A may be proportional to $$\frac{v_i}{V_i}$$

where $v_i$ is the variance of the visual atom i appearing in mutated versions of the same visual nucleotide, and $V_i$ is the variance of the visual atom i appearing in any visual nucleotide. Further, $v_i$ and $V_i$ may be estimated from training video data.

Gap penalty methods: In some embodiments, the gap penalty can be a parametric function of the form $\gamma(i,j,n;\theta)$, where i and j are the starting position of the gap in the two sequences, n is the gap length, and $\theta$ are parameters. The parameters may be estimated empirically from the training data, and the training data may consist of examples of video sequences with inserted and deleted content. Further, the gap penalty may be a function of the form: $\gamma(n)=a+bn$, where n is the gap length and a and b are parameters. Still further, the gap penalty may be a convex function or inversely proportional to the probability of finding a gap of length n starting at positions i and j in the two sequences.

Spatial correspondence methods: Methods of computing spatial correspondence may include:
  inputting temporally corresponding subsets of video data;
  providing feature points in subsets of video data;
  finding correspondence between feature points;
  finding correspondence between spatial coordinates.

Temporally corresponding subsets of video data may be at least one pair of temporally corresponding frames. Further, finding correspondence between feature points further may include:
  inputting two sets of feature points;
  providing descriptors of feature points;
  matching descriptors;

The feature points may be the same as used for video nucleotides computation, and the descriptors may be the same as used for video nucleotides computation.

Also, finding correspondence between feature points may be performed using a RANSAC algorithm or consist of finding parameters of a model describing the transformation between two sets of feature points, wherein finding parameters of a model may be performed by solving the following optimization problem $$\theta^* = \arg\min_{\theta} T(\{(x_i, y_i)\}, \{(x_j, y_j)\}; \theta)$$

where $\{(x_i,y_i)\}$ and $\{(x_j,y_j)\}$ are two sets of feature points and T is a parametric transformation between sets of points depending on parameters $\theta$.

The correspondence between spatial coordinates may be expressed as a map between the spatial system of coordinates (x, y) in one subset of video data and spatial system of coordinates (x', y') in another subset of video data.

Output methods: the output spatio-temporal correspondence between subsets of video data may be represented as a map between the spatio-temporal system of coordinates (x, y, t) in one subset and spatio-temporal system of coordinates (x', y', t') in another subset.

Figure 15:
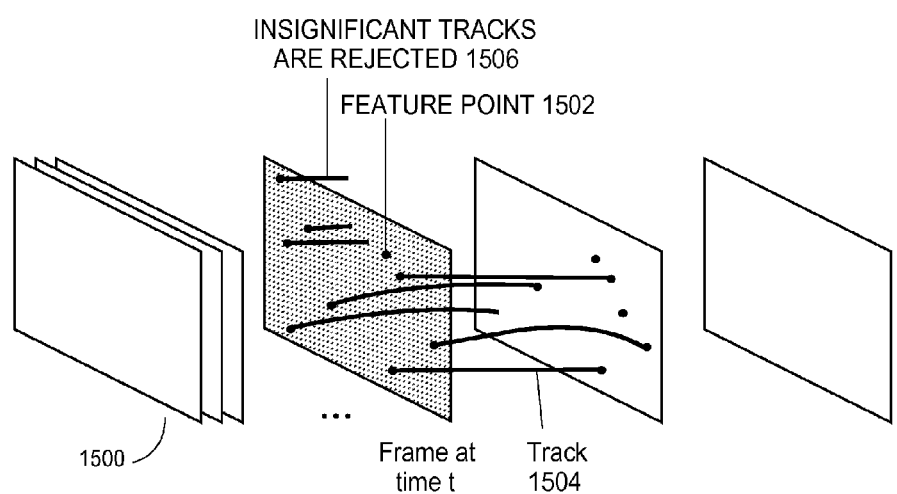
FIG. 15 shows an example overview of the video DNA generation process.

An example of the video DNA generation process is shown in FIG. 15. Here, a local feature detector is applied in a frame-wise manner to the various image frames of the video sequence (1500). This feature detector finds points of interest (1502), also referred to as "feature points", in the video sequence. As previously discussed, many different types of feature detectors may be used, including the Harris corner detector (C. Harris and M. Stephens "A combined corner and edge detector", Alvey Vision Conference, 1988), the Kanade-Lucas algorithm (B. D. Lucas and T. Kanade, "An iterative image registration technique with an application to stereo vision", 1981) SIFT scale-space based feature detectors (D. G. Lowe, Distinctive image features from scale-invariant keypoints, IJCV, 2004) and others. Generally, this feature detection algorithm is designed in such a way that the feature descriptors are robust or invariant to spatial distortions of the video sequence (e.g., change of resolution, compression noise, etc.). In order to reduce transient noise and focus on the most useful features, the features are often tracked over multiple frames (1504), and features that appear for too short a period are deleted or pruned (1506).

Figure 16:
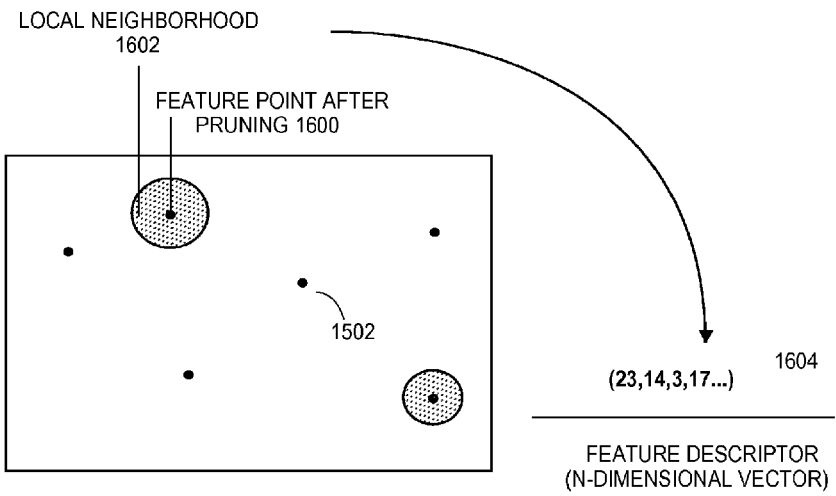
FIG. 16 shows an example of how video features are processed during video DNA generation.

The next stage of the video DNA generation process is shown in FIG. 16. Here FIG. 16 shows a detail of one video image frame, where the dots in the frame (1502) correspond to image features that have been detected. Here the feature points remaining after feature pruning (1600) are then described using a local feature descriptor. This feature descriptor generates a second type of vector that represents the local properties (local neighborhood) (1602) of the video frame around a feature point (1600). As previously discussed, many different algorithms can be used to describe the properties of the video image frame around a feature point. These algorithms can include a local histogram of edge directions, the scale invariant feature transform (SIFT), the speed up robust features (SURF) algorithm (H. Bay, T. Tuytelaars and L. van Gool, "Speed up robust features", 2006).

Mathematically, this feature descriptor can be represented as a second type of vector that describes the local properties of video image (1604) associated with each feature point. This second type of vector of values can correspond to many types of properties of the local neighborhood (1602) near the pruned feature point (1600). Some vector coefficients (1604) could correspond to the presence or absence of image edges at or near point (1600), others may correspond to the relative image brightness or color near point (1600), and so on. Thus a video DNA "nucleotide" or signature that describes a video "snippet" (short temporal series of video frames) contains two types of vectors: a first type of vector that tells how many different types of feature descriptors are in the snippet, and a second type of vector that is used to mathematically describe the properties of each of the individual feature descriptors.

In order to create a standardized process that can enable many different videos to be easily compared, rather than using descriptors that are unique to each segment of video, it is often desirable to create a standardized library of descriptors that can be used for many different videos, and do a best fit to "map", "bin", or "assign" the descriptors from any given video into this standardized library or "vocabulary".

Figure 17:
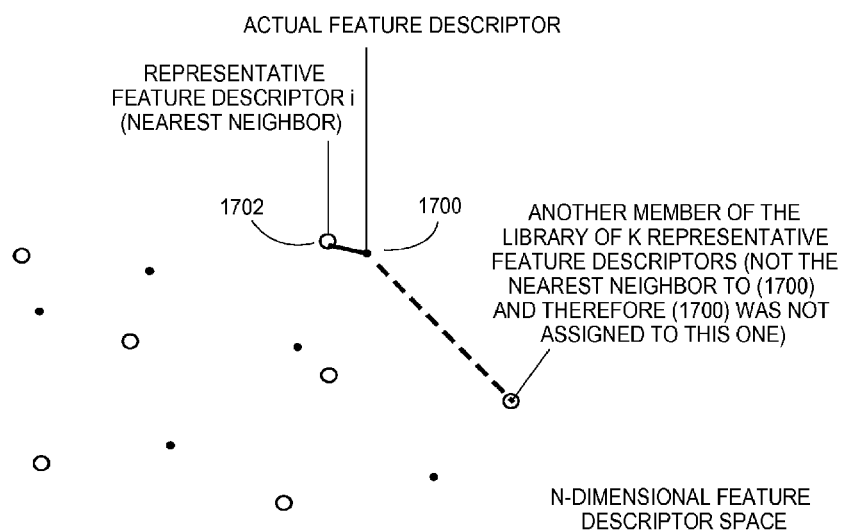
FIG. 17 show an example of how video feature descriptors are binned into a standardized library (visual vocabulary) of feature descriptors.

In FIG. 17, as previously discussed, the actual feature descriptors (1700) for the visual environment around each pruned feature point (FIG. 16, 1600) are then assigned to "bins" according to the "visual library" or "visual vocabulary" which is a pre-computed set of feature descriptor types. This visual vocabulary can be viewed as a standardized library of feature descriptors. Here, a finite set (usually around 1000 or more) of "ideal" representative feature descriptors is computed, and each "real" feature descriptor is assigned to whatever "ideal" feature descriptor in the "visual vocabulary" most closely matches the "real" feature descriptor. As a result, each "real" feature descriptor (1700) from the portion of the actual video is binned into (or is replaced by) the corresponding closest element in the visual vocabulary (1702), and only the index (i.e., the fact that this particular library feature descriptor had another closed neighbor) of the closest "ideal" or representative descriptor is stored, rather than the real descriptor (1700) itself.

From a nomenclature standpoint, features represented this way will occasionally be referred to in this specification as "visual atoms". As a rough analogy, the visual vocabulary can be viewed as a "periodic table" of visual atoms or elements. Continuing this analogy, the visual vocabulary can be thought of as a "periodic table" of visual elements.

Figure 18:
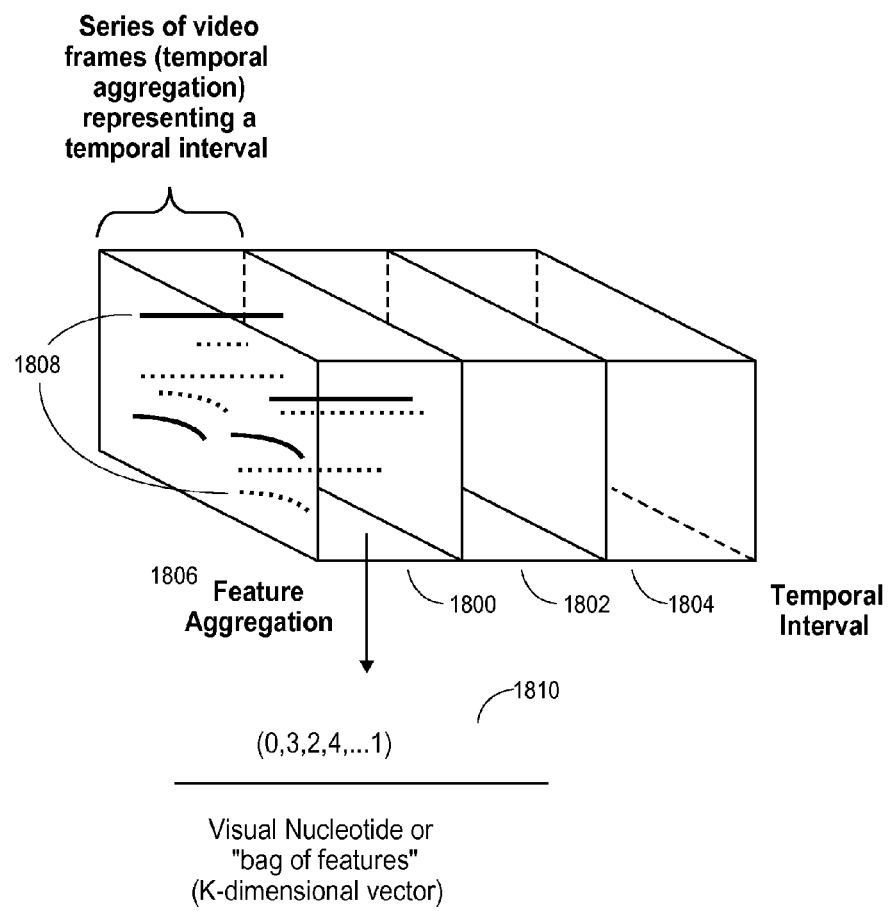
FIG. 18 shows an example of how video is segmented into various short multiple-frame intervals or "snippets" during the video DNA creation process.

FIG. 18 gives additional details showing how the original video is segmented into multiple-frame intervals (temporal segmentation). In this stage, the video sequence is segmented into various time (temporal) intervals or snippets (1800), (1802), (1804), etc. These intervals can be of fixed size (e.g., every 10 frames represents one interval), or of variable size, and can be either overlapping or non-overlapping. Often it will be convenient to track features, and segment the video into regions where the features remain relatively constant, which will often correspond to a particular cut or edit of a particular video scene. Such segmentation can be done, for example, based on the feature tracking from the previous stage. It should be noted that the segmentation is usually done automatically by a pre-determined algorithm.

Next, the now visual-vocabulary-binned visual feature descriptors (visual atoms) in each temporal interval are combined (aggregated) (1806). Here, the space and time coordinates of the features themselves (1808) are not used, rather it is the sum total of the different types of feature descriptors present in the series of video frames (temporal interval) that is used here. This process essentially ends up creating a histogram, vector, or "bag of feature (descriptors)" (1810) for each series of video frames. The frequency of appearance of the various binned feature descriptors (visual atoms) can be represented as a histogram or vector, and as used herein, this histogram or vector is occasionally referred to as a visual nucleotide.

This "bag of features" method of abstracting or indexing a video has a number of advantages. One advantage is that this method is robust, and can detect relationships between related videos even if one or both of the videos are altered by overlaying pixels over the original frames, spatially edited (e.g., cropped), changed to different resolutions or frame rates, and the like. For example, if one of the video sequences has been modified (e.g., by overlaying pixels over the original frames), the new video sequence will consist of a mixture of features (one set belonging to the original video and the other set belonging to the overlay). If the overlay is not very large (i.e., most of the information in the frame belongs to the original video), it is still possible to correctly match the two visual nucleotides from the two videos by adopting a relaxed matching criteria that determines that the nucleotides (histograms or vectors of features) match with less than 100% correspondence between the two.

Figure 19:
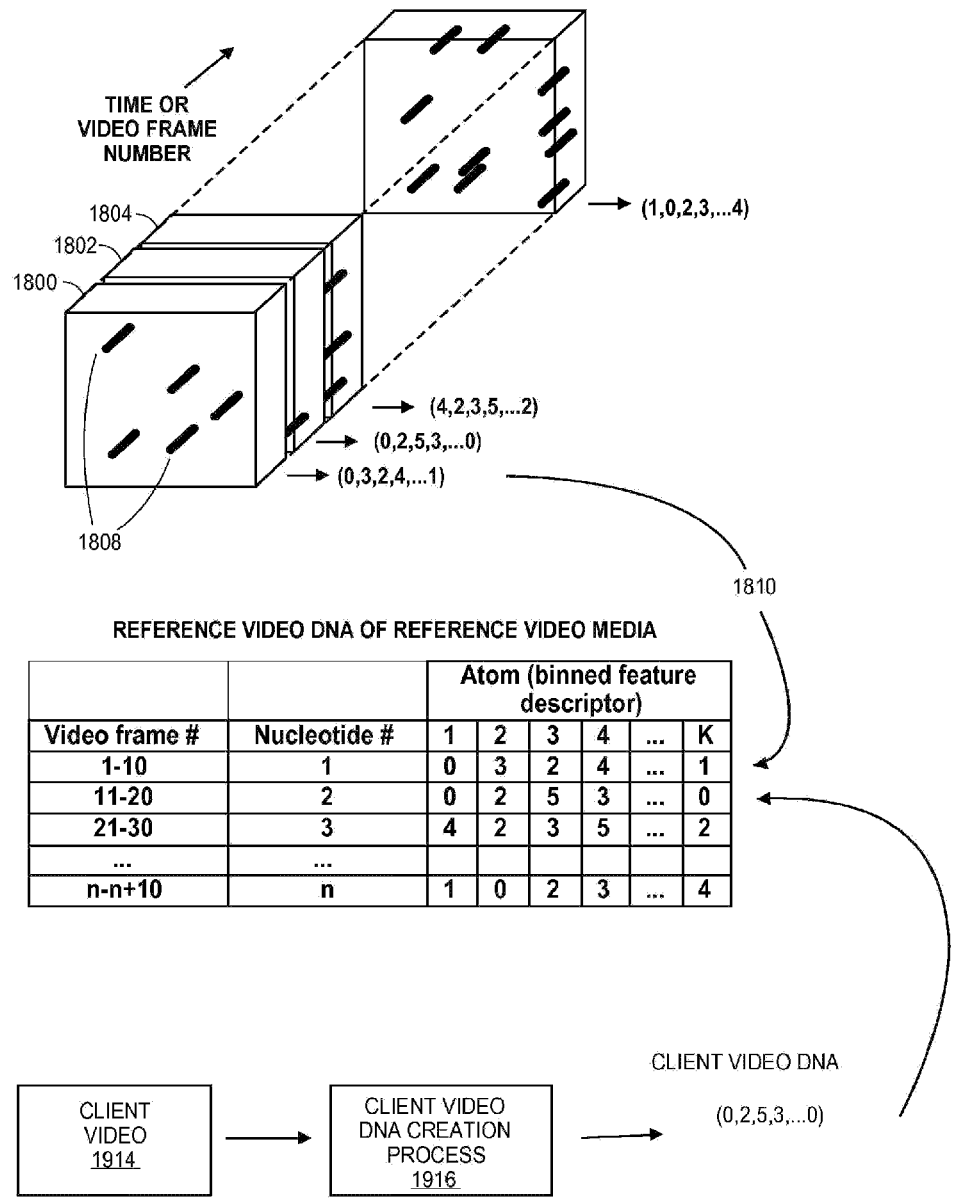
FIG. 19 shows an example of how a video can be indexed and described by its corresponding video DNA.

FIG. 19 shows an example formation of the video DNA for a particular media. Here, the video DNA consists of an ordered array or "sequence" of the different "histograms", "vectors of feature descriptors", or "nucleotides" taken from the various time segments (snippets) (1800), (1802), (1804), etc. of the video. Either video, that is either the original reference video intended for the metadata database on a server, or a client video which can be a copy of the original reference video, can be abstracted and indexed by this video DNA process, and generally the video DNA created from a reference video will be similar enough to the video DNA created by a client video so that one video DNA can be used as an index or match to find a correspondence with the other video DNA.

This reference video DNA creates an index that allows another device, such as a client about to play a client copy of the reference video, to locate the portion of the video that the client is about to play in the reference or server video DNA database. As an example, a client about to play a client video (1914) can compute (1916) the video DNA of the client video by the same video DNA process, send the video DNA signature of this client video DNA to the server or other device holding the reference video DNA, the position and nature of this series of video frames can be determined by using the client video DNA as an index into the server or reference video DNA database. This index in turn can be used to retrieve metadata from the server database that corresponds to the portion of video that is being played on the client.

As previously discussed, even when a relatively large array (i.e. hundreds or thousands) of different feature detection algorithms are used to analyze video images, not all image features will fit neatly into each different feature algorithm type. Some image features descriptors will either not precisely fit into a specific feature descriptor algorithm, or else will have an ambiguous fit. To improve the overall fidelity of the video DNA process, it is often useful to try use nearest neighbor algorithms to try to get the closest fit possible. In the nearest neighbor fit, the actual observed features (feature descriptors) are credited to the counter bin associated with the feature descriptor algorithm that most closely fits the observed feature descriptor.

The temporal matching of client-side and reference video DNAs can be performed using a variety of different algorithms. These algorithms can range from very simple "match/no match algorithms", to bioinformatics-like "dot matrix" algorithms, to very sophisticated algorithms similar to those used in bioinformatics for matching of biological DNA sequences. Examples of some of these more complex bioinformatics algorithms include the Needleman-Wunsch algorithm, described in S. B Needleman, C. D Wunsch, "A general method applicable to the search for similarities in the amino acid sequence of two proteins", 1970; Smith-Waterman algorithm, described in T. F. Smith and M. S. Waterman, "Identification of common molecular subsequences", 1981; and heuristics such as Basic Local Alignment Search Tool (BLAST), described in S. F. Alschul et al., "Basic Local Alignment Search Tool", 1990.

Often, a suitable sequence matching algorithm will operate by defining a matching score (or distance), representing the quality of the match between two video sequences. The matching score comprises two main components: similarity (or distance) between the nucleotides and gap penalty, expressing to the algorithm the criteria about how critical it is to try not to "tear" the sequences by introducing gaps.

In order to do this, the distance between a nucleotide in a first video and a corresponding nucleotide in a second video must be determined by some mathematical process. That is, how similar is the "bag of features" from the first series of frames of one video similar to the "bag of features" from a second series of frames from a second video? This similarity value can be expressed as a matrix measuring how similar or dissimilar the two nucleotides are. In a simple case, it can be a Euclidean distance or correlation between the vectors (bags of features) representing each nucleotide. If one wishes to allow for partial similarity (which frequently occurs, particularly in cases where the visual nucleotides may contain different features due to spatial edits), a more complicated metric with weighting or rejection of outliers can be used. More complicated distances may also take into consideration the mutation probability between two nucleotides: two different nucleotides are more likely similar if they are likely to be a mutation of each other. As an example, consider a first video with a first sequence of video images, and a second video with the same first sequence of video images, and a video overlay. Clearly many video features (atoms, or elements) in the bag describing the first video will be similar to many video features in the bag describing the second video, and the "mutation" here is those vide features that are different because of the video overlay.

The gap penalty is a function accounting for the introduction of gaps between the nucleotides of a sequence. If a linear penalty is used, it is simply given as the number of gaps multiplied by some pre-set constant. More complicated gap penalties may take into consideration the probability of appearance of a gap, e.g. according to statistical distribution of advertisement positions and durations in the content.

Although the term "video DNA" gives a good descriptive overview of the described video signature method, it should be evident that matching the different video nucleotides can be more complex than matching biological nucleotides. A biological nucleotide is usually a simple "A", "T", "G", or "C", whereas a video DNA nucleotide is a more complex "bag of features" (bag of feature descriptors). Thus it is quite often the case that a given video nucleotide will never quite find a perfect match. Rather, the criterion for a "match" is usually going to be a close but not quite perfect match. Often, this match will be determined by a distance function, such as a distance, a L1 distance, the Mahalanobis distance, the Kullback-Leibler divergence distance, the Earth Mover's distance, or other function. That is, an example match is whenever video nucleotide "distance"<=threshold.

A smaller match criteria is considered to be a more stringent match (i.e. fewer video DNA nucleotides or signatures will match with each other), and a larger match criteria is considered to be a less stringent match (i.e. more video DNA nucleotides or signatures will match with each other).

Figure 20:
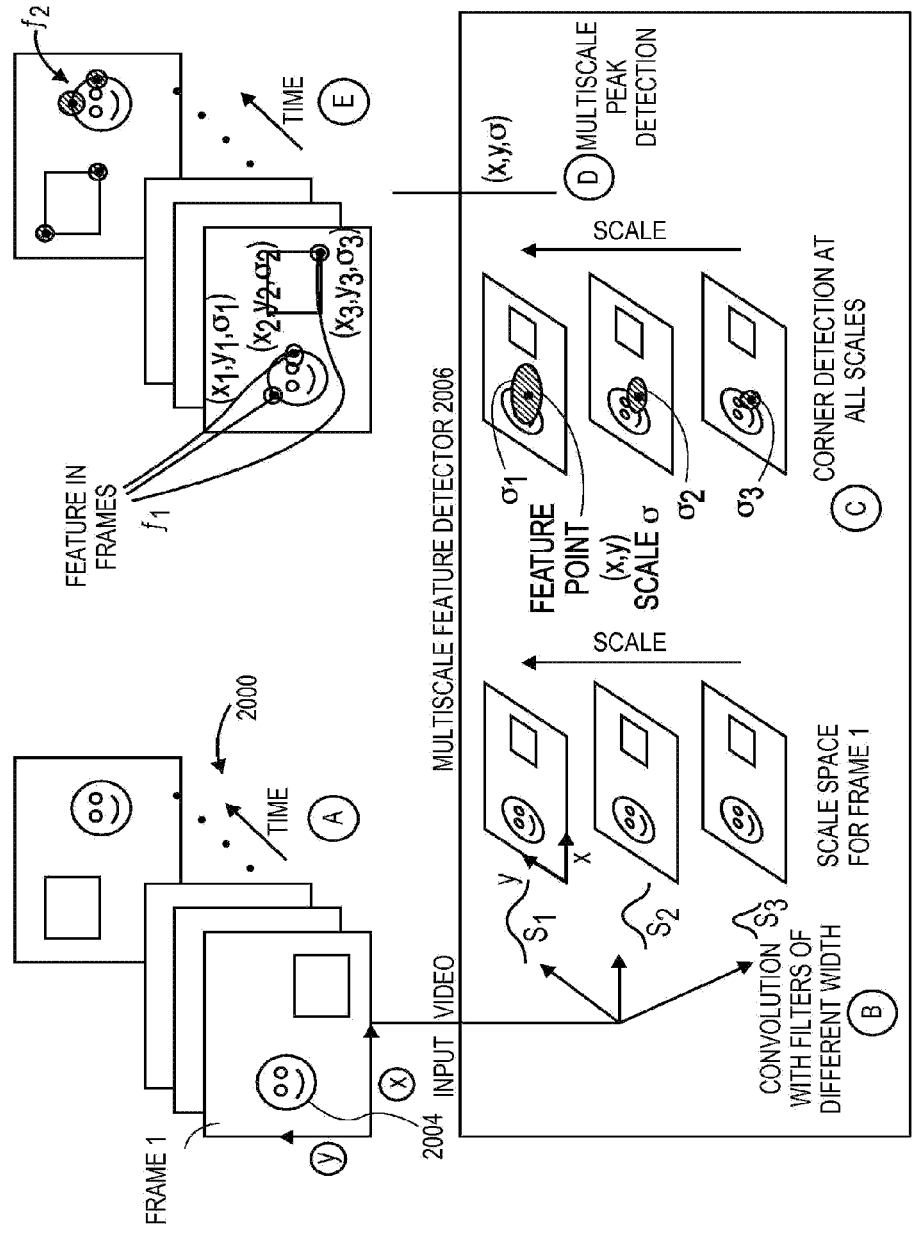
FIG. 20 illustrates an example of the video signature feature detection process.

Referring to FIGS. 20-24, a series of diagrams are shown to illustrate a process configured according to the systems and methods described herein. FIG. 20 illustrates an example of the video signature feature detection process. In this example, an input video (A) is composed of a series of various frames 2000 having a feature image 2004 and an area defined by x and y over a period of time is used as input into a multi-scale feature detector 2006. The video signals s1, s2, s3 are subjected to a convolution with filters of different spatial width (B), producing a series of images with different feature scales of resolution. These different scale space images are then analyzed (for example by corner detection), at the different scales 1,2,3 in (C). The picture can then be described by a series of multiscale peaks (D) where certain features f1, f2, in the frames (E) are identified.

Figure 21:
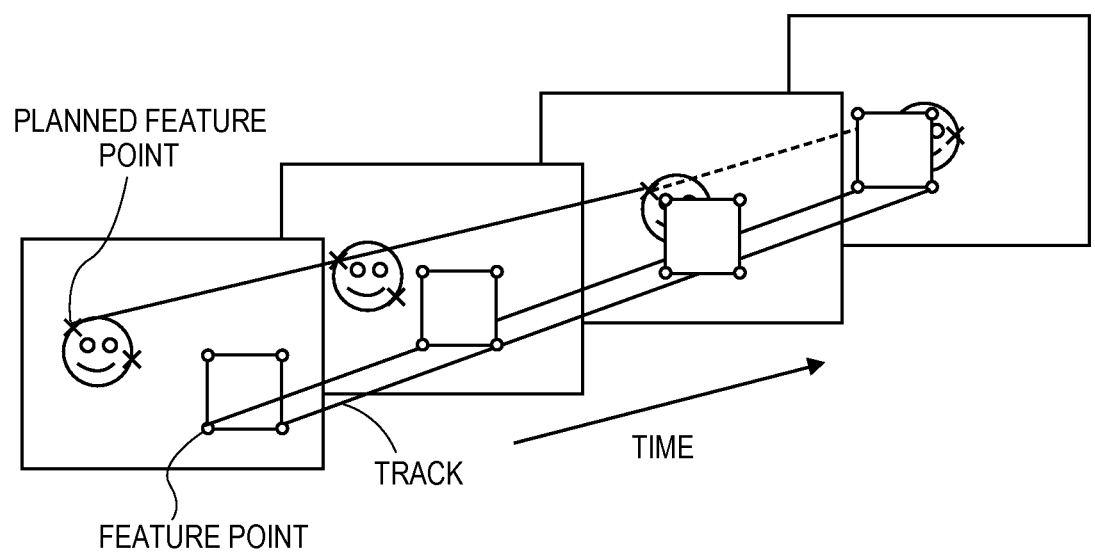
FIG. 21 shows an example of the video signature feature tracking and pruning process.

FIG. 21 shows an example of the video signature feature tracking and pruning process. This is an optional stage, but if it is used, features may be tracked over multiple frames and features that persist for enough (e.g., meet a preset criteria) frames are retained, while transient features that do not persist long enough to meet the criteria are rejected.

Figure 22:
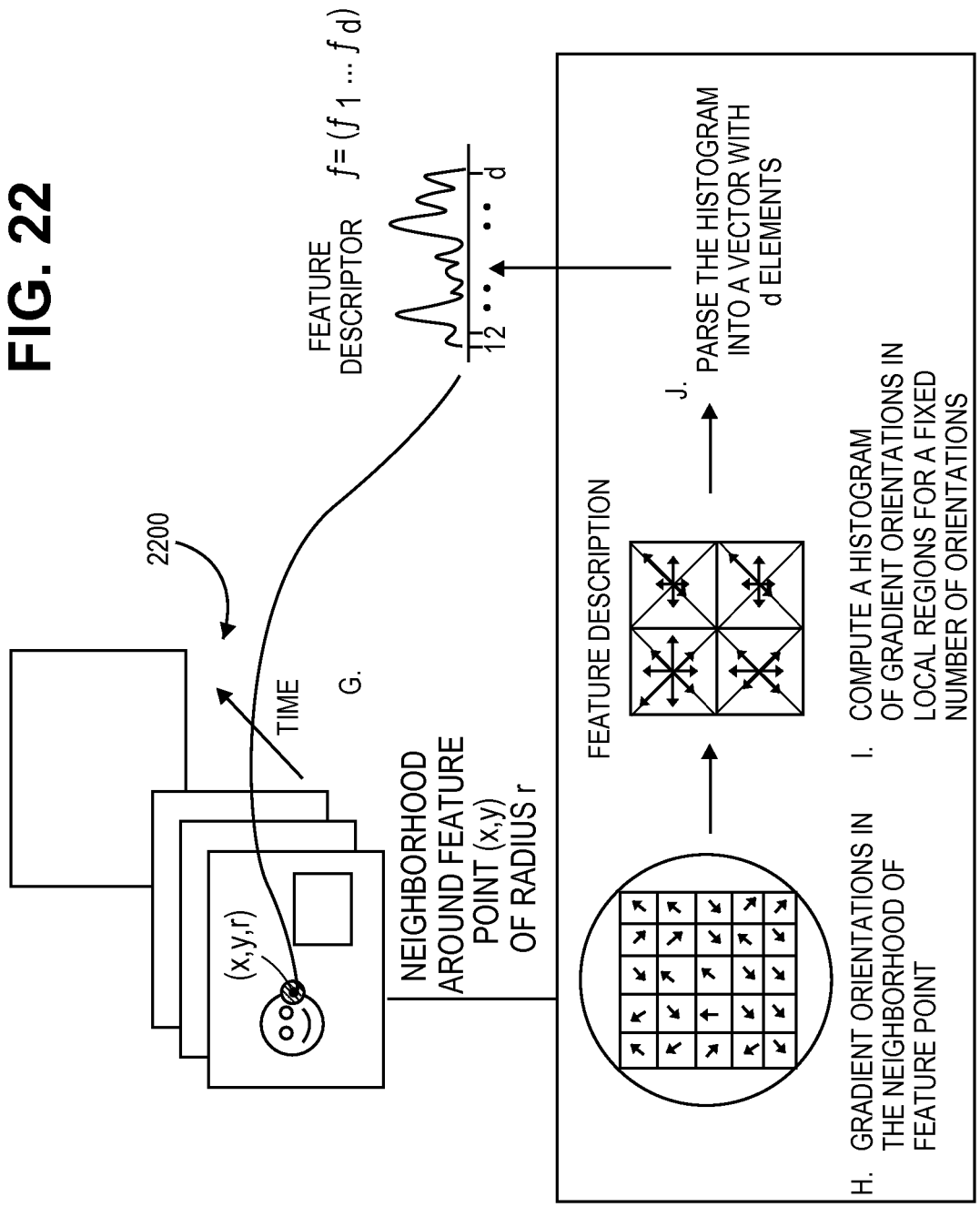
FIG. 22 shows an example of video signature feature description.

FIG. 22 shows an example of video signature feature description. The example of FIG. 22 illustrates how previously detected features can then be described. In general, the process works by again taking the input video 2200, and this time analyzing the video in the neighborhood (x, y, r) around each of the previously detected features (G). This feature description process can be done by a variety of different methods. In this example, a SIFT gradient of the image around the neighborhood of a feature point is computed (H), and from this gradient a histogram of gradient orientations in local regions for a fixed number of orientations is generated (I). This histogram is then parsed into a vector with elements (J), called a feature descriptor.

Figure 23:
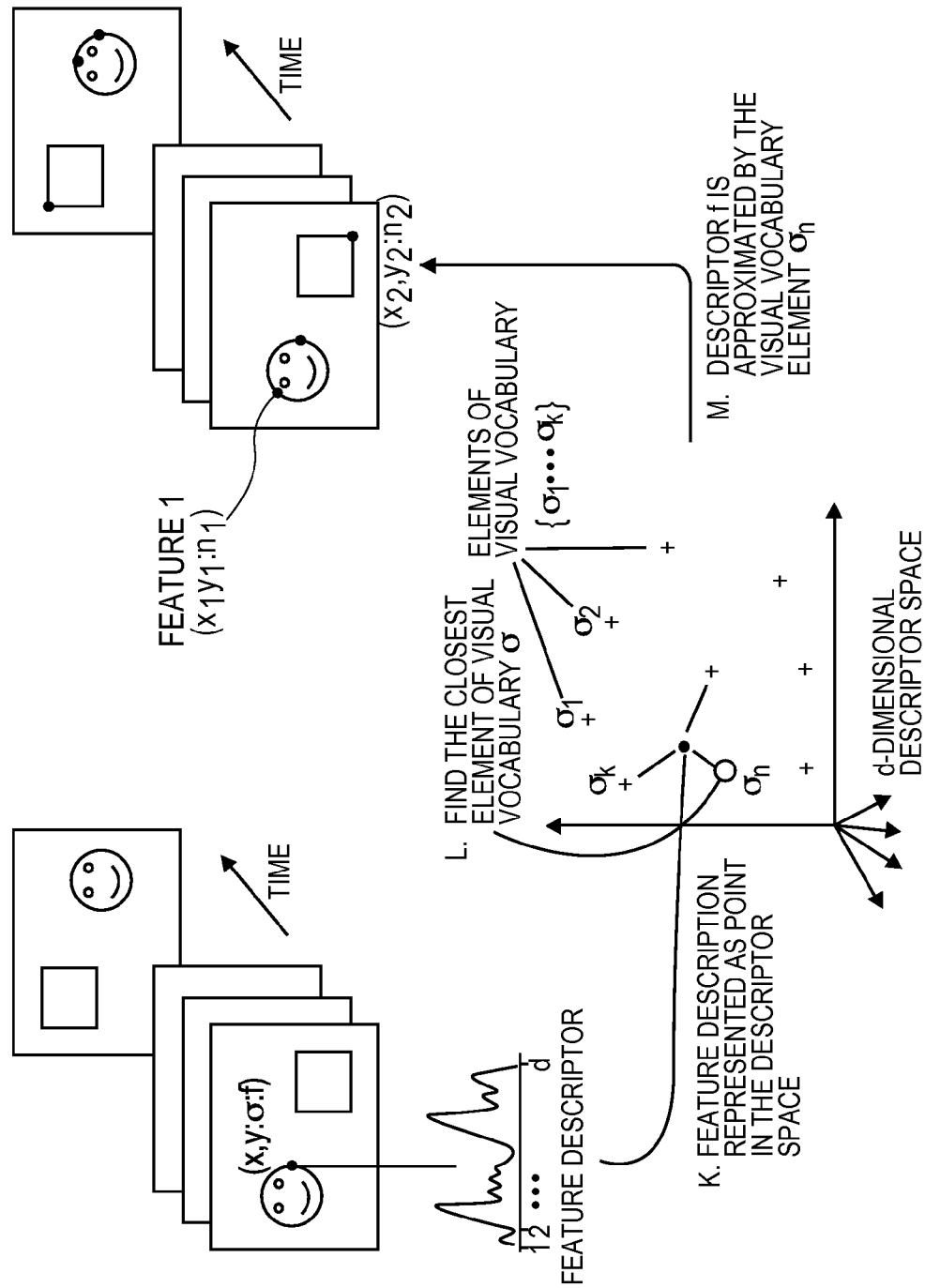
FIG. 23 shows an example of a vector quantization process.

FIG. 23 shows an example of a vector quantization process that maps an image into a series of quantized feature descriptors. In this example, the video image, previously described as a feature descriptor vector (K) with an arbitrary feature descriptor vocabulary, is mapped onto a standardized d-dimensional feature descriptor vocabulary (L). This use of a standardized descriptor vocabulary enables a standardized scheme (M) that is capable of uniquely identifying video, regardless of source.

Figure 24:
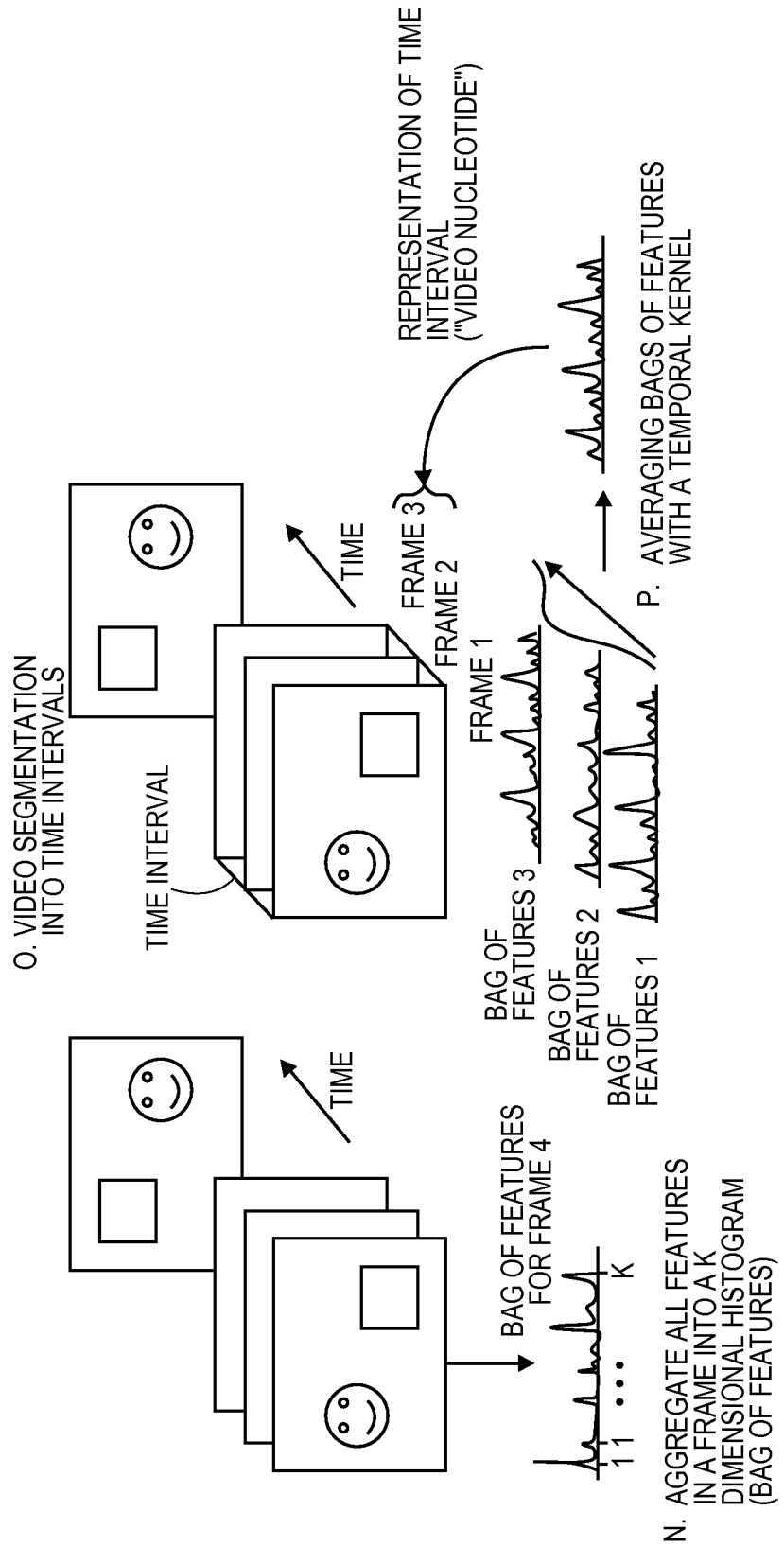
FIG. 24 shows an example of video DNA construction.

FIG. 24 shows an example of video DNA construction. In contrast to standard video analysis, which often analyzes video on a frame-by-frame basis, video DNA often combines or averages bags of features from multiple video frames to produce an overall "video nucleotide" for a time interval. An example of this is shown in FIG. 8. As previously discussed, the video data is analyzed and bags of features for particular frames are aggregated into k dimensional histograms or vectors (N). These bags of features from neighboring video frames (e.g., frame 1, frame 2, frame 3) are then averaged (P), producing a representation of a multi-frame video time interval, often referred to herein as a "video nucleotide".

Figure 25:
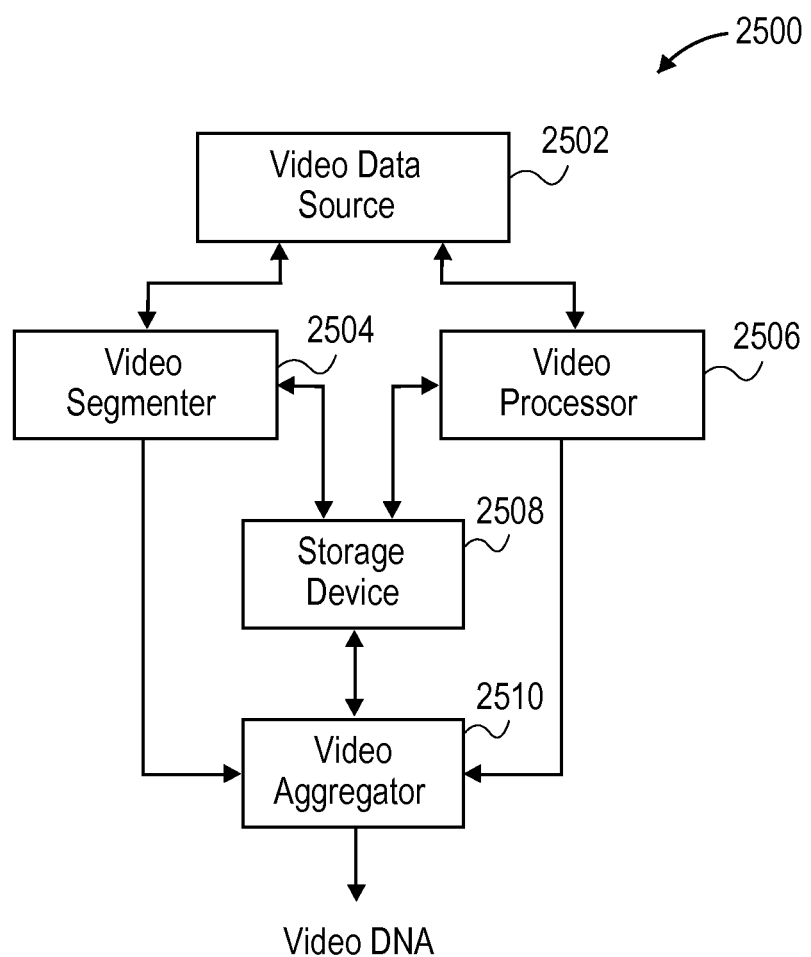
FIG. 25 shows an example system for processing video data as described herein.

FIG. 25 shows an example system 2500 for processing video data as described herein. A video data source 2502 stores and/or generates video data. A video segmenter 2504 receives video data from video data source 2502 and segments the video data into temporal intervals. A video processor 2506 receives video data from video data source 2502 and performs various operations on the received video data. In this example, video processor 2506 detects feature locations within the video data, generates feature descriptors associated with the feature locations, and prunes the detected feature locations to generate a subset of feature locations. A video aggregator 2510 is coupled to video segmenter 2504 and video processor 2506. Video aggregator 2510 generates a video DNA associated with the video data. As discussed herein, the video DNA can include video data ordered as sequences of visual nucleotides.

A storage device 2508 is coupled to video segmenter 2504, video processor 2506, and video aggregator 2510, and stores various data used by those components. The data stored includes, for example, video data, frame data, feature data, feature descriptors, visual atoms, video DNA, algorithms, settings, thresholds, and the like. The components illustrated in FIG. 25 may be directly coupled to one another and/or coupled to one another via one or more intermediate devices, systems, components, networks, communication links, and the like.

Embodiments of the systems and methods described herein facilitate identification and correlation of multiple video content identifiers associated with specific video content. Additionally, some embodiments may be used in conjunction with one or more conventional video processing and/or video display systems and methods. For example, one embodiment may be used as an improvement of existing video processing systems.

Although the components and modules illustrated herein are shown and described in a particular arrangement, the arrangement of components and modules may be altered to perform the identification and correlation of multiple video content identifiers in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method of lookup of video-related data, capable of operating with different versions of related video content, comprising:
   receiving a request from a requesting device for information for a first version of video content;
   identifying a first video content identifier associated with either the entire video content, the filename of the video content, a particular time interval within the video content, or a spatio-temporal object in the first version of video content from a video content source;
   using said first video content identifier to retrieve first metadata associated with said first version of video content;
   wherein said first metadata is at least one of untimed metadata, timed metadata associated with a time interval, or spatio-temporal metadata associated with a spatio-temporal object in said first version of video content;
   wherein irrespective of if said first metadata is available, then:
   translating said first video content identifier into a second video content identifier;
   wherein translating said first video content identifier into a second video content identifier comprises finding a correspondence between spatial and temporal coordinates of image features in the first version of video content associated with the first video content identifier, and the spatial and temporal coordinates of image features of a second version of video content associated with said second video content identifier;
   wherein said first version of video content and said second version of video content comprise either identical versions of the same original video content, or different but related versions of said original video content;
   wherein said different but related versions of said original video content differ by at least one of different edits, different aspect ratios, or different transcoding versions;
   retrieving second metadata based on said second video content identifier; and providing, to the requesting device, the first metadata if said first metadata is available, and said second metadata.

2. The method of claim 1, wherein the first video content identifier is a file content-based identifier associated with payload of a video file.

3. The method of claim 2, wherein the first video content identifier is a hash value computed from the payload of said video file.

4. The method of claim 1, wherein the first video content comprises video image frames with image portions, and the first video content identifier is a video content-based identifier associated with visual information obtained from said image portion of said video image frames of the first video content.

5. The method of claim 1, wherein the source of the first version of video content is a DVD and the first video content identifier is a DVDid.

6. The method of claim 1, wherein the first version of video content is obtained from a file in a peer-to-peer network and the first video content identifier is a hash value associated with the file.

7. The method of claim 1, wherein the first version of video content is obtained from a video file stored on a server and the first video content identifier is a URL identifying the server and the video file.

8. The method of claim 1, wherein translating the first video content identifier into a second video content identifier includes finding a correspondence between temporal coordinates in a first version of video content data associated with the first video content identifier and a second version of video content data associated with the second video content identifier.

9. The method of claim 1, wherein the first metadata is retrieved from a first metadata source and the second metadata is retrieved from a second metadata source.

10. The method of claim 1, wherein translating the first video content identifier into a second video content identifier includes performing the translation in response to each received request.

11. The method of claim 1, wherein translating the first video content identifier into a second video content identifier includes retrieving a second video content identifier previously generated by:
   finding a plurality of correspondences between a plurality of spatial and temporal image feature coordinates in the first version of video content associated with the first video content identifier, and a plurality of spatial and temporal image feature coordinates of a second version of video content associated with the second video content identifier;
   saving said plurality of correspondences in memory;
   and using said first content identifier to retrieve the corresponding second video content identifier from memory.

12. The method of claim 1, wherein identifying a first video content identifier includes receiving a first video content identifier from the requesting device.

13. The method of claim 1, further comprising identifying a correspondence between a timeline associated with said first version of video content and a timeline associated with the second metadata.

14. The method of claim 13, further comprising providing the identified correspondence to the requesting device.

15. A method of lookup of video-related data, capable of operating with different versions of related video content, comprising:
   receiving a request for metadata for a first version of a video program, wherein the request includes a first video content identifier associated with said first version of a video program;
   identifying a first video sequence in said first version of a video program;
   finding a correspondence between the spatial and temporal coordinates of image features of said first video sequence in said first version of a video program, and the spatial and temporal coordinates of image features of a second version of said video program;
   wherein said first version of a video program and said second version of a video program comprise either identical versions of the same original video program, or different but related versions of said original video program;
   wherein said different but related versions of said original video program differ by at least one of different edits, different aspect ratios, or different transcoding versions;
   using said correspondence to identify a second video content identifier associated with said second version of a video program based on the identified first video sequence; and
   retrieving the requested metadata from a metadata source based on said second video content identifier.

16. The method of claim 15, wherein the retrieved requested metadata is subtitle information associated with said second video program.

17. The method of claim 15, wherein the retrieved requested metadata includes reviews associated with the second video program.

18. The method of claim 15, further identifying a correspondence between a timeline associated with the said first version of a video program and a timeline associated with the retrieved metadata;
   wherein identifying a metadata timeline correspondence includes calculating a spatial, temporal, or spatio-temporal correspondence between the first version of a video program and the retrieved metadata; or
   wherein identifying a metadata timeline correspondence includes retrieving a previously computed correspondence from a storage device.

19. An apparatus for lookup of video-related data, capable of operating with different versions of related video content, comprising:
   a communication module configured to receive a request from a requesting device for information for a first version of video content, and at least one processor;
   said at least one processor coupled to the communication module and configured to identify a first video content identifier associated with said first version of video content, said at least one processor further configured to retrieve first metadata associated with said first version of video content based on the first video content identifier;
   said at least one processor additionally configured to handle situations, even if said first metadata is unavailable, to also satisfy said request with information associated with a second version of video content;
   said additional configuration being to translate the first video content identifier into a second video content identifier;
   said at least one processor configured to use said first video content identifier associated with said first version of video content to identify first video content video image frames comprising first video content image features with spatial coordinates and temporal coordinates, and to determine image features in the spatial coordinates and temporal coordinates identified by said first video content identifier in said first version of video content;
   said translation using image features in the spatial coordinates and temporal coordinates identified by said first video content identifier in said first version of video content to find a second video content identifier in said second video content that identify corresponding image features in the spatial coordinates and temporal coordinates in said second video content;
   wherein said first version of video content and said second version of video content comprise either identical versions of a same original video content, or different but related versions of said original video content;
   wherein said different but related versions of an original video content differ by at least one of different edits, different aspect ratios, or different transcoding versions;
   wherein said at least one processor is further configured to retrieve second metadata based on the second video content identifier and provide, to the requesting device, said first metadata if said first metadata is available, and said second metadata.

20. The apparatus of claim 19, wherein said at least one processor is further configured to find a correspondence between temporal coordinates or spatial and temporal coordinates in video content associated with the first video content identifier and video content associated with the second video content identifier.

\* \* \* \* \*